United States Patent
Zhao et al.

(10) Patent No.: US 10,136,653 B2
(45) Date of Patent: Nov. 27, 2018

(54) METHOD FOR IMPROVING BRAN AND GERM FLAVOR AND TEXTURE

(71) Applicant: Intercontinental Great Brands LLC, East Hanover, NJ (US)

(72) Inventors: Bin Zhao, East Hanover, NJ (US); Sarwat Gabriel, East Hanover, NJ (US); Lynn Haynes, Morris Plains, NJ (US); Francois Errandonea, Hopatcong, NJ (US)

(73) Assignee: Intercontinental Great Brands LLC, East Hanover, NJ (US)

(*) Notice: Subject to any disclaimer, the term of this patent is extended or adjusted under 35 U.S.C. 154(b) by 0 days.

(21) Appl. No.: 14/777,219

(22) PCT Filed: Mar. 6, 2014

(86) PCT No.: PCT/US2014/021007
§ 371 (c)(1),
(2) Date: Sep. 15, 2015

(87) PCT Pub. No.: WO2014/149810
PCT Pub. Date: Sep. 25, 2014

(65) Prior Publication Data
US 2016/0021899 A1   Jan. 28, 2016

Related U.S. Application Data

(60) Provisional application No. 61/793,254, filed on Mar. 15, 2013.

(51) Int. Cl.
| A23L 7/10 | (2016.01) |
| A21D 13/02 | (2006.01) |
| A21D 6/00 | (2006.01) |
| A23L 5/20 | (2016.01) |

(52) U.S. Cl.
CPC ............. *A21D 13/02* (2013.01); *A21D 6/003* (2013.01); *A23L 5/21* (2016.08); *A23L 7/115* (2016.08); *A23L 7/197* (2016.08); *A23L 7/198* (2016.08); *A23L 7/1975* (2016.08); *A23V 2002/00* (2013.01)

(58) Field of Classification Search
USPC ......................................... 426/449, 463, 465
See application file for complete search history.

(56) References Cited

U.S. PATENT DOCUMENTS

| 4,350,714 A | 9/1982 | Duvall |
| 4,435,430 A | 3/1984 | Fulger |
| 4,500,558 A | 2/1985 | Fulger |
| 4,769,251 A * | 9/1988 | Wenger .................. A23L 7/143 |
| | | 426/448 |
| 6,010,732 A | 1/2000 | Van Lengerich |
| 6,383,547 B1 | 5/2002 | Delrue |
| 7,258,888 B2 | 8/2007 | Dreese et al. |
| 8,133,527 B2 | 3/2012 | Haynes et al. |
| 8,173,193 B2 | 5/2012 | Haynes et al. |
| 2005/0136173 A1 | 6/2005 | Korolchuk |
| 2006/0073258 A1 | 4/2006 | Korolchuk |
| 2007/0269579 A1 | 11/2007 | Mingus |
| 2007/0292583 A1 | 12/2007 | Haynes |
| 2009/0155439 A1* | 6/2009 | Gingras .................. A23L 7/198 |
| | | 426/507 |

FOREIGN PATENT DOCUMENTS

| CN | 102123598 | 7/2011 |
| EP | 1393634 | 3/2004 |
| JP | S61268144 | 11/1986 |
| KR | 20030009827 A | 2/2003 |
| WO | 2006/127922 | 11/2006 |
| WO | 2007/149320 | 12/2007 |
| WO | 2012/142399 | 10/2012 |
| WO | 2012129733 A1 | 10/2012 |
| WO | 2012/148543 | 11/2012 |
| WO | 2014197465 A1 | 12/2014 |

OTHER PUBLICATIONS

International Search Report issued in PCT/US2014/021007 dated Jul. 14, 2014, 4 pages.
Database Biosis, "Use of a spouted bed to improve the storage stability of wheat germ followed in paper and polyethlyene packages", XP-0022726312, 2 pages, Jun. 26, 2014.
(Continued)

*Primary Examiner* — Lien T Tran
(74) *Attorney, Agent, or Firm* — Fitch, Even, Tabin & Flannery LLP

(57) ABSTRACT

The flavor and texture of a ground bran and germ component or fraction is improved by subjecting the ground bran and germ component to heating while conveying and mixing the ground bran and germ component in a conveying and mixing device. The heating may be conducted to heat the bran and germ component or fraction to a temperature of from about 285° F. to about 410° F. to volatilize volatile wheaty flavor components and moisture in the ground bran and germ component and to develop a buttery, nutty, caramelized flavor in the bran component. The wheaty flavor components and moisture are removed from the mixing and conveying device during the heat treatment. The use of substantial moisture reduction with high temperature heating at a low moisture content provides flavor development while reducing wheatiness, graininess, or rawness, and also achieves lipase inhibition and stabilization against rancidity from free-fatty acid production.

18 Claims, 1 Drawing Sheet

(56) References Cited

OTHER PUBLICATIONS

Written Opinion of the International Searching Authority for PCT/US2014/021007 dated Jul. 14, 2014, 4 pages.
Notice of Opposition for European Patent No. 2983504 dated Jun. 6, 2018.
Wikipedia, "Cereal Germ," http://en.wikipedia.org/wiki/Cereal_germ, printed May 29, 2018.

* cited by examiner

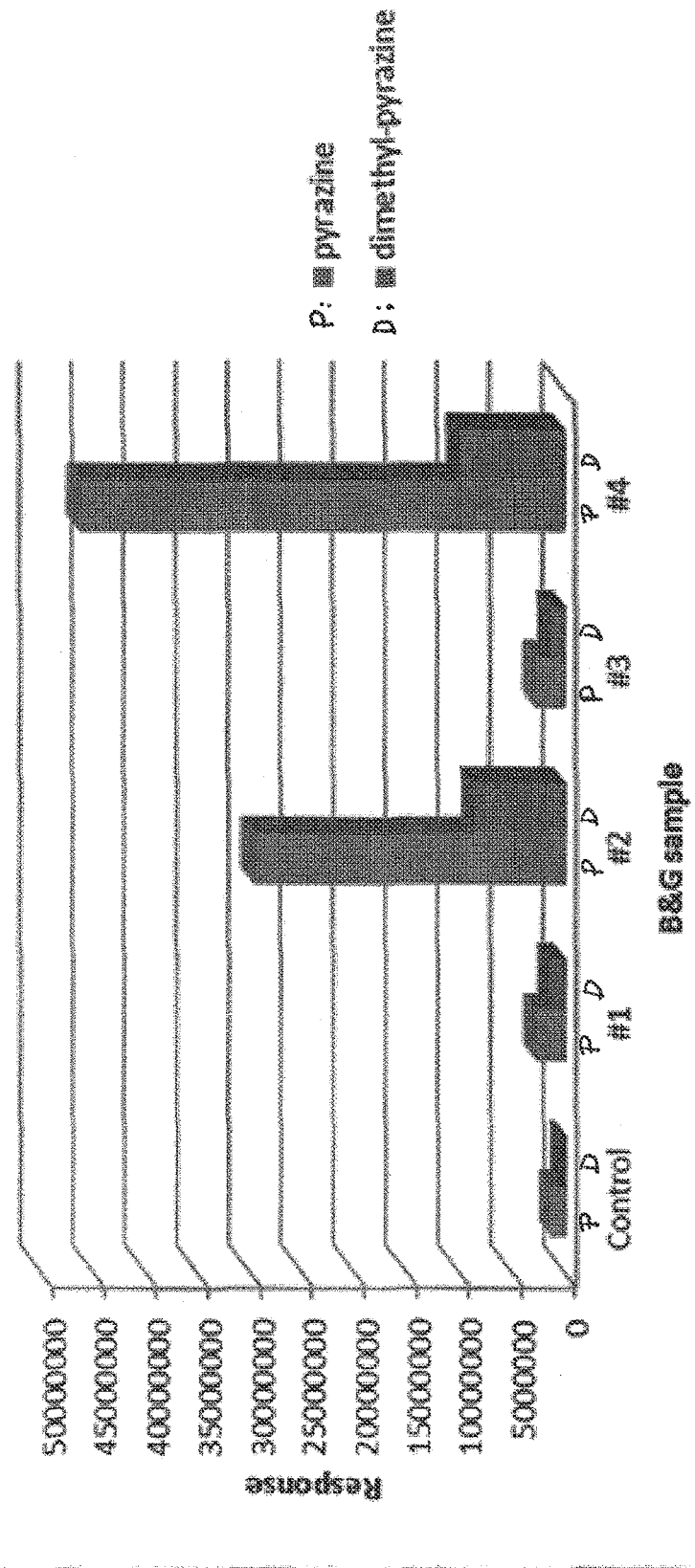

METHOD FOR IMPROVING BRAN AND GERM FLAVOR AND TEXTURE

CROSS-REFERENCE TO RELATED APPLICATIONS

This application is a U.S. national phase application filed under 35 U.S.C. § 371 of International Application PCT/US2014/021007, filed Mar. 6, 2014, designating the United States, which claims the benefit of U.S. Provisional Application No. 61/793,254, filed Mar. 15, 2013, which are both hereby incorporated herein by reference in their entirety.

FIELD OF THE INVENTION

The present invention relates to continuous processes for improving the flavor and texture of bran and germ components or ingredients which may be used for making stabilized whole grain flours. The present invention also relates to food products, such as baked goods made from the improved bran components and whole grain flours having superior texture and flavor.

BACKGROUND

Food products containing elevated levels of whole grain are recommended by the 2010 dietary guidelines published by the USDA because whole grains are a good source of nutrients of concern. For adults, these nutrients include calcium, potassium, fiber, magnesium, and vitamins A (as carotenoids), C, and E. However, consumption of whole grain foods has lagged mainly due to certain qualities of whole grain foods, such as coarse, gritty appearance and texture from the whole grain flour ingredient typically available for use. More recently, commercial whole grain wheat flours are marketed with reduced particle size. However, baked goods made from the whole grain flours still exhibit a dry, grainy mouth-feel and a "wheaty," grainy, or hay taste or flavor, and low amounts of brown, caramelized baked flavor.

Steam or other heat sources are used to inactivate enzymes such as lipase and lipoxygenase in whole grains. Inactivation of lipase or lipoxygenase may also be achieved by heating a bran fraction or bran component to obtain a stabilized bran component and then combining the stabilized bran component with an endosperm fraction or component to obtain a stabilized whole grain flour. However, heating of whole grains or bran fraction or bran component to inactivate enzymes does not assure elimination of a wheaty, grainy taste and attainment of improved texture and flavor in baked goods. Also, heating of whole grains to inactivate enzymes to obtain a stabilized whole grain flour can result in excessive gelatinization of starch or may denature proteins and adversely affect gluten network development. The excessive gelatinization or interruption of gluten network production can adversely affect dough machinability, and flour functionality in baked goods such as cookies and crackers in terms of solvent retention capacity and oven spread.

Accordingly, there is a long felt need for a method of producing bran and germ components and whole grain flours which do not exhibit a wheaty or raw taste, or a rancid taste or odor, but which exhibit a buttery, nutty caramelized taste and non-gritty texture, and excellent dough machinability and baking functionality, without substantial interruption of gluten network production, as well as stabilization against enzymatic degradation.

SUMMARY OF THE INVENTION

In an embodiment, the flavor and texture of a ground bran and germ component or fraction is improved by subjecting the ground bran and germ component to heating while conveying and mixing the ground bran and germ component in a conveying and mixing device. The ground bran and germ component or fraction comprising bran and germ subjected to the treatment may have at least 50% by weight bran and a moisture content of from about 5% by weight to about 25% by weight, based upon the weight of the ground bran and germ component or fraction. The heating, such as by direct or indirect steam injection, may be conducted to heat the bran and germ component or fraction to a temperature of from about 285° F. to about 410° F. to volatilize volatile wheaty flavor components and moisture in the ground bran and germ component and to develop a buttery, nutty, caramelized flavor in the bran component. The wheaty flavor components and moisture are removed from the mixing and conveying device during the heat treatment to reduce the moisture content of the bran and germ component by about 30% by weight to about 75% by weight and to obtain a dried ground bran component having a moisture content of from about 1.5% by weight to about 10% by weight. The dried ground bran component is removed from the conveying and mixing device to obtain a non-expanded ground bran and germ component having a non-wheaty, nutty, caramelized flavor and a non-gritty texture. The use of substantial moisture reduction with high temperature heating at a low moisture content provides flavor development while reducing wheatiness, graininess, or rawness, and also achieves lipase inhibition and stabilization against rancidity from free-fatty acid production.

In an embodiment, moisture content, treatment temperature and time, and shear may be used to control starch gelatinization and baking functionality for bran and germ components or fractions which contain starch or endosperm.

In an aspect, the heating of the bran and germ component may be conducted to avoid substantial gelatinization of starch contained in the bran and germ component by conveying and mixing at low pressure, and heating at low moisture contents. In such embodiments, the ground bran and germ component subjected to heating may have a moisture content of from about 5% by weight to about 12% by weight, preferably from about 7% by weight to about 9% by weight, most preferably from about 7.5% by weight to about 8.5% by weight, based upon the weight of the ground bran and germ component, the heating may be to a temperature of about 290° F. to about 350° F., preferably from about 310° F. to about 330° F. to volatilize volatile wheaty flavor components and moisture in the ground bran and germ component and to develop a buttery, nutty, caramelized flavor in the bran component. Also, the moisture content of the bran and germ component may be reduced by about 30% by weight to about 75% by weight to obtain a dried ground bran component having a moisture content of from about 1.5% by weight to about 4.5% by weight, preferably from about 2.5% by weight to about 3.5% by weight, most preferably from about 2.8% by weight to about 3.2% by weight, and the heating may be conducted for a period of time of from about 1 minute to about 6 minutes, preferably from about 2 minutes to about 4 minutes, most preferably from about 2.5 minutes to about 3.5 minutes.

In another aspect, the heating of the bran and germ component may be conducted to achieve substantial gelatinization of starch contained in the bran and germ component by conveying and mixing at high pressure and high shear in a cooker extruder at low moisture contents to develop a caramelized flavor without burning of the component. In such embodiments, the flavor and texture of a bran and germ component is improved by subjecting a ground bran and germ component to heating which has a moisture content of from about 10% by weight to about 25% by weight, preferably from about 12% by weight to about 18% by weight, most preferably from about 14% by weight to about 16% by weight, based upon the weight of the ground bran and germ component, the heating may be to a temperature of about 285° F. to about 410° F., preferably from about 300° F. to about 395° F., most preferably from about 310° F. to about 330° F. to volatilize volatile wheaty flavor components and moisture in the ground bran and germ component and to develop a buttery, nutty, caramelized flavor in the bran component. Also, the moisture content of the bran and germ component may be reduced by about 30% by weight to about 75% by weight to obtain a dried ground bran component having a moisture content of from about 4% by weight to about 10% by weight, preferably from about 5% by weight to about 8% by weight, most preferably from about 6% by weight to about 7% by weight, and said heating is conducted for a period of time of less than about 1 minute. The cooker extrusion input, or specific mechanical energy (SME) may be from about 20 W*hr/kg to about 120 W*hr/kg, preferably from about 20 W*hr/kg to about 120 W*hr/kg, preferably about 30 W*hr/kg to about 60 W*hr/kg, most preferably from about 35 W*hr/kg to about 55 W*hr/kg.

In yet another aspect, a bran and germ component having a non-wheaty, nutty, caramelized flavor and a non-gritty texture is obtained, and may be admixed with an endosperm fraction to obtain a whole grain flour having a non-wheaty, nutty, caramelized flavor and a non-gritty texture. The bran and germ component and the whole grain flour exhibit substantially reduced lipase activity, and stabilization against rancidity from free-fatty acid production, and excellent baking functionality.

In another embodiment, a whole grain flour with improved flavor and texture may be produced by subjecting a ground bran and germ component to heating while conveying and mixing the ground bran and germ component in a conveying and mixing device, the ground bran and germ component comprising bran and germ having at least 50% by weight bran and a moisture content of from about 5% by weight to about 25% by weight, based upon the weight of the ground bran and germ component, where the heating is to a temperature of from about 285° F. to about 410° F. to volatilize volatile wheaty flavor components and moisture in the ground bran and germ component and to develop a buttery, nutty, caramelized flavor in the bran component. The, wheaty flavor components and moisture are removed from the mixing and conveying device during the heating to reduce the moisture content of the bran and germ component by about 30% by weight to about 75% by weight and to obtain a dried ground bran component having a moisture content of from about 1.5% by weight to about 10% by weight. The dried ground bran component is removed from the conveying and mixing device to obtain a non-expanded ground bran and germ component having a non-wheaty, nutty, caramelized flavor and a non-gritty texture, which is admixed with an endosperm fraction to obtain a whole grain flour.

In another embodiment of the invention, bran and germ components, whole grain flours, and baked goods containing the bran and germ component are provided which exhibit positive sensory attributes of buttery, nutty, caramelized, flavor and non-gritty texture are increased and negative sensory attributes of wheaty, grainy or raw taste, or a rancid taste or odor, are decreased compared to a control produced without bran and germ component heat treatment, by at least 3%, based upon sensory evaluation by an expert taste panel using a scale of 1 to 100 where a rating of 1 has the lowest intensity, and a rating of 100 has the highest intensity of the sensory attribute.

BRIEF DESCRIPTION OF THE DRAWINGS

The Sole FIGURE shows a graph of levels of selected nutty flavor related compounds found in bran and germ low pressure, heat treated samples treated at various temperatures and moisture contents, and an untreated control sample.

DETAILED DESCRIPTION OF THE INVENTION

Reference now will be made to certain detailed aspects of various embodiments of the invention. It is to be understood that the disclosed embodiments are merely exemplary of the invention that may be embodied in numerous and alternative forms. Therefore, specific details disclosed herein are not to be interpreted as limiting, but merely as a representative basis for any aspect of the invention and/or as a representative basis for teaching one skilled in the art to variously employ the invention.

Except in the examples, or where otherwise expressly indicated, all numerical quantities in this description indicating amounts of material and/or use are to be understood as modified by the word "about" in describing the broadest scope of the invention. Practice within the numerical limits stated is generally preferred.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a", "an", and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application in their entirety to more fully describe the state of the art to which this invention pertains.

The term "whole grain" includes the grain in its entirety, for example as a wheat berry or kernel, prior to any processing. As indicated in the U.S. Food and Drug Administration (FDA) Feb. 15, 2006 draft guidance and as used herein, the term "whole grain" includes cereal grains that consist of the intact, ground, cracked or flaked fruit of the grains whose principal components—the starchy endosperm, germ and bran—are present in the same relative proportions as they exist in the intact grain. The FDA outlined that such grains may include barley, buckwheat, bulgur, corn, millet, flee, rye, oats, sorghum, wheat and wild rice.

The term "refined wheat flour product" is a wheat flour that meets the FDA standards for a refined wheat flour product of a particle size in which not less than 98% passes through a U.S. Wire 70 sieve (210 microns).

The term "milling" as used herein includes the steps of rolling, breaking sifting and sorting the whole grain to separate it into its constituent parts, which may also result in some reduction of particle size of the constituent parts.

The term "grinding" as used herein includes any process directed to reducing particle size, including but not limited to colliding particles against one another or mechanically reducing the particle size.

The term "tempering" as used herein is the process of adding water to wheat before milling to toughen the bran and mellow the endosperm of the kernel and thus improve flour separation efficiency.

The term "hydration" or "post-hydration" as used herein refers to the step of adjusting hydration post-milling or post-grinding to adjust the moisture content of an individual constituent and/or to adjust the moisture content of the final flour.

Also, as used herein, lipase or enzyme "inhibition" means that the lipase or enzyme is no longer producing its enzyme product or has substantially reduced the production of its enzyme product. The term "inhibition" as used herein further includes lipase inactivation, wherein the lipase or enzyme is inactivated or substantially inactivated. For example, lipase inhibition means that the lipase enzyme is not hydrolyzing the triglycerides and releasing free fatty acids in the flour. The inhibition or ability of the enzyme to produce its enzyme product may be reversible or irreversible. For example, heating of an enzyme to denature the enzyme may irreversibly inactivate the enzyme. Treatment with an enzyme inhibitor may reversibly or irreversibly inactivate an enzyme. For example, acid treatment to inhibit lipase reduces production of the enzyme product, i.e. formation of free fatty acids. However, with reversible inhibition, there may still be extractable enzyme activity or measurable lipase activity. When extracting the enzyme to measure its activity, the inhibition to its activity may be removed by placing the enzyme into a higher pH environment where its activity is restored or reversed. Also, acid treatment may lower the pH to such an extent that the lipase inhibition is irreversible or the lipase inactivation is irreversible, so that there is both reduced formation of enzyme product and lower extractable enzyme activity.

It has been found that stabilization of whole grain flour by heat treating a bran and germ component or fraction to reduce lipase activity does not eliminate wheaty flavor notes or graininess or provide a caramelized, buttery, flavor and a smooth, less particulate or grainy texture to the bran and germ component or fraction, and to whole grain flours made from the component. Finished baked goods containing whole grain flour are perceived by the consumer to have more green, fatty, oxidized grassy flavor notes (wheaty flavor) compared to products made with white flour. Oxidation compounds, such as compounds related to lipid oxidation from linoleic and linolenic acids (free fatty acids, FFA), generated during lipid degeneration, saturated aldehydes, and unsaturated aldehydes, are believed to be responsible for the wheaty flavor perceived in whole grain flour baked goods. Volatile compounds believed to be responsible for the wheaty flavor and which are removed during the ground bran and germ component treatment of the present invention include hexanal, heptadienal, nonanal, decanal, nonenal, heptenal, 1-octen-3-one, 3,5-octadien-2-one, decadienal, nonadienal, octenal, and combinations or mixtures thereof.

The temperatures employed during stabilization are generally too low, or applied for too short a period, and the moisture contents are too high to develop substantial flavor improvement in terms of a sweet, buttery, browned, caramelized, baked flavor and to remove the chemical components which impart a wheaty flavor or hay or raw taste, and graininess. In the bran and germ component, whole grain flours containing the component, and to baked goods containing the component or whole grain flour. In embodiments of the invention, input moisture contents, moisture removal or venting, and treatment temperatures are employed which are critical for providing flavor and texture improvement with elimination of a wheaty, grainy taste in a bran and germ component or fraction, stabilized whole grain flours containing the bran and germ component or fraction, and baked goods containing the bran and germ component or fraction or stabilized whole grain flour. The treated bran and germ components or fractions, stabilized whole grain flours, and baked goods containing them, exhibit a brown, caramelized sweet, buttery baked flavor, and a smooth, non-gritty texture. In addition, lipase activity is reduced to provide stabilized bran and germ components and stabilized whole grain flours, without loss of baking functionality or detrimental effects caused by excessive cooking or gelatinization, solvent absorption, or loss of gluten strength.

In embodiments of the invention, the flavor and texture of a ground bran and germ component or fraction is improved by subjecting the ground bran and germ component to heating while conveying and mixing the ground bran and germ component in a conveying and mixing device. The ground bran and germ component or fraction may be obtained by the milling of whole grains in the production of whole grain flours. The whole grains may be tempered or untempered. The milling and grinding of the whole grains, and the bran and germ fraction to obtain a desired particle size distribution generally reduces the moisture content of the bran and germ fraction, particularly as the particle size decreases which creates a greater surface area for evaporation of moisture. Heat treatment at low moisture contents facilitates browning, and caramelization. However, in embodiments of the invention where starch gelatinization may be desired, or where increased lipase inhibition for stabilization is desired, the moisture content of a bran and germ fraction may be increased, by tempering or by hydration. Also, in embodiments, moisture contents may be raised to facilitate removal of undesirable volatile flavor components.

The ground bran and germ component or fraction comprising bran and germ which is fed to the conveying and mixing device and subjected to the heat treatment may have at least 50% by weight bran and a moisture content of from about 5% by weight to about 25% by weight, based upon the weight of the ground bran and germ component or fraction. The feed or input temperature of the ground bran and germ component or fraction upon entering the conveying and mixing device may be less than about 120° F., generally from room temperature up to about 120° F., for example from about 70° F. to about 100° F. In the conveying and mixing device, the heating, may be conducted to heat the bran and germ component or fraction to a temperature of from about 285° F. to about 410° F. when it leaves the device, or at the exit die. The heating should be sufficient to volatilize volatile wheaty flavor components as well as moisture in the ground bran and germ component and to develop a buttery, nutty, caramelized flavor in the bran and germ component or fraction. The wheaty flavor components and moisture are removed from the mixing and conveying device during the heat treatment to reduce the moisture content of the bran and germ component by about 30% by weight to about 75% by weight and to obtain a dried ground bran component having a moisture content of from about 1.5% by weight to about 10% by weight. The volatile components and moisture may be removed by venting, through vent holes or open barrels in the conveying and mixing device. Vacuum may be applied to assist in the removal of the volatile wheaty components and moisture. The dried ground bran component is removed from the conveying and mixing device through an exit end or die to obtain a non-expanded ground bran and germ component having a non-wheaty, nutty, caramelized flavor and a non-gritty texture. The use of substantial moisture reduction with high temperature heating at a low moisture content provides flavor development while reducing wheatiness or astringency, graininess, or rawness, and also achieves lipase inhibition and stabilization against rancidity from free-fatty acid production. The heating may be achieved by indirect heating using jacketed barrels and/or hollow mixing and conveying screws which are heated with a heating medium, such as steam or other known heat transfer medium or fluids. In preferred embodiments, direct steam injection may be employed, such as via a hollow screw with elements containing holes for passage of the steam directly into the bran and germ component as it is being mixing and conveyed. Generally, the amount of moisture added by direct steam injection is less than about 5% by weight, for example from about 1% by weight to about 3% by weight, based upon the weight of the ground bran and germ component or fraction.

The higher input moisture contents for the bran and germ component or fraction may be employed where higher degrees of gelatinization are desired, such as for the production of high moisture content baked goods such as cakes and breads. However, lower input moisture contents are used where substantial starch gelatinization is to be avoided for baking functionality in the production of low moisture content baked goods such as crackers and cookies, and snacks.

In embodiments where the heating of the bran and germ component is conducted to avoid substantial gelatinization of starch contained in the bran and germ component, such as for low moisture content baked good applications such as cookies, crackers, and snacks, the conveying and mixing may be at low pressure, with heating being at low moisture contents. In such embodiments, the ground bran and germ component subjected to heating may have a moisture content of from about 5% by weight to about 12% by weight, preferably from about 7% by weight to about 9% by weight, most preferably from about 7.5% by weight to about 8.5% by weight, based upon the weight of the ground bran and germ component. The heating of the ground bran and germ component or fraction may be from an input or feed temperature of less than about 120° F. to an exit temperature from the device of about 290° F. to about 350° F., preferably from about 310° F. to about 330° F., sufficient to volatilize volatile wheaty flavor or astringent components and moisture in the ground bran and germ component and to develop a buttery, nutty, caramelized flavor in the bran component. The heating and venting are performed to be sufficient for reducing the moisture content of the bran and germ component by about 30% by weight to about 75% by weight to obtain a dried ground bran component having a moisture content of from about 1.5% by weight to about 4.5% by weight, preferably from about 2.5% by weight to about 3.5% by weight, most preferably from about 2.8% by weight to about 3.2% by weight, which is critical for caramelized flavor development. The heating may be conducted for a period of time of from about 1 minute to about 6 minutes, preferably from about 2 minutes to about 4 minutes, most preferably from about 2.5 minutes to about 3.5 minutes to reduce the moisture content and develop desirable flavor notes. The low pressure conveying and mixing device may be operated at atmospheric pressure with high pressure steam injection using a steam pressure of from about 20 psi to about 200 psi, preferably from about 50 psi to about 150 psi, most preferably from about 80 psi to about 120 psi.

Exemplary of low pressure, relatively low shear, conveying and mixing devices for use in the low pressure, low gelatinization embodiments of the present invention is a Turbulizer® continuous high shear paddle mixer, manufactured by Bepex International LLC, 333 N.E. Taft Street, Minneapolis, Minn. 55413, USA. The paddle elements allow adjustment of angle and housing clearance. This feature of paddle mixers, in combination with high paddle tip speeds, up to 13,000 ft./min., provides flexibility for control of residence time and the mix intensity or shear imparted on materials. Residence time can be controlled and can be very short, in the range of 2-30 seconds. The thin working layer of material in the paddle mixers promotes excellent indirect heat transfer efficiency in jacketed models and a self-cleaning effect that eliminates lost product on start up and shut down.

Another low pressure conveying and mixing device which may be employed is a Solidaire® Drying System, manufactured by Bepex International LLC, 333 N.E. Taft Street, Minneapolis, Minn. 55413, USA. Such systems may include a jacketed cylinder with a high-speed paddle rotor that creates a highly agitated, dense, thin layer of material against the jacketed vessel wall for high heat transfer coefficients, with material residence times being adjustable from under one minute to about 15 minutes. Superior gas contact can result in material temperatures at the wet bulb temperature during constant rate drying, eliminating the need for vacuum. Venting may be achieved with low density, fine particles that might otherwise be fluidized in mechanically or pneumatically agitated equipment. Indirect heat transfer, where heat is conducted through the cylindrical housing, may be employed, or direct heat transfer, in which heat is transferred by convection using a large volume of gas may be employed. Direct heat transfer may be applied using a co-current flow of material and gas. The two components may be separated downstream in a cyclone or bag filter. A combination, of indirect and direct heat transfer can be used to optimize energy efficiency while also reducing the material temperature. The jet rotor design allows injection of a gas or liquid, such as steam, through the paddles into the thin layer of material flowing in a spiral along the cylindrical wall of the unit.

Another device which may be employed is a Bepex Thermascrew® Dryer which exchanges heat indirectly through a hollow screw and a jacketed body trough. Product is conveyed by the rotation of a single or double screws. Residence time is controlled by the rotor speed and ranges from several minutes to one hour. The product usually enters one end and moves by screw rotation to the discharge point at the other end. Heat is transferred when it comes into contact with the hollow screw, shaft and jacket surfaces. The heat exchange medium enters at the rotary joint, moves through the hollow screw, and moves back out again. The medium also enters the jacket near the product outlet point, discharging at the opposite end of the trough. A baffle arrangement in the jacket ensures positive flow. Screw rotation speed controls retention time and discharge temperature of the product. The tumbling action of the short pitch screw makes the heat exchange uniform and efficient. Body styles include a non-jacketed trough, a jacketed trough, a pipe trough with jacket and a trough with multiple screws. Optional steam orifices along the trough permit direct as well as conductive heating, making the unit useful in live steam heating. Purge gas or air may be injected as well. The Thermascrew® may operate in either a pressure or vacuum environment, any gases produced during the process can be recovered. Rotor styles include a hollow screw the same diameter as the trough and a hollow screw with a smaller diameter than the trough. With the first type, optional lifter bars—mounted between screw flights—improve agitation by tumbling the product. With the second style, continuous ribbons or lifter bars—mounted between the outer edge of the screw and flush with the inner surface of the trough—mix the product even more and require higher rotational rates, improving heat-transfer coefficients.

Another low pressure conveying and mixing device which may be employed is the Bepex Continuator® Dryer, which has a jacketed trough that provides indirect heat transfer. By adding gas through specially designed nozzles in the bottom of the trough, this dryer maximizes gas contact with the product. This enhances mass transfer of volatile materials, making the Continuator® Dryer ideal for removing tightly entrapped volatiles in materials with very fine particle size or poor flowability. With a long, low profile, this indirect heat transfer system may be employed as a second stage to the Solidaire® Dryer. Vessels can be designed for batch or continuous operation or to meet pressure or vacuum requirements.

In embodiments of the invention, the low pressure conveying and mixing device may have a screw configuration which includes, from the upstream or input end to the downstream or output end, a series of twin lead feed screws, a series of kneading blocks, a blocking element, a single lead feed screw, a series of kneading blocks, a single lead feed screw, and a twin lead discharge feed screw.

In embodiments of the invention, the treatment temperature and treatment time, and moisture contents in the low pressure conveying and mixing device may be controlled so that starch gelatinization resulting from the flavor developing heat treatment and stabilization in the heat treated, stabilized ground bran and germ component or fraction may be less than about 25%, preferably less than about 10%, most preferably less than about 5%, as measured by differential scanning calorimetry (DSC). The low degree of starch gelatinization and low degree of starch damage achieved in the present invention are exemplified by a starch melting enthalpy of greater than about 4 J/g, preferably greater than about 5 J/g, based upon the weight of starch in the heat treated, stabilized ground bran and germ component or fraction, as measured by differential scanning calorimetry (DSC), at a peak temperature of from about 65° C. to about 70° C. In embodiments the heat treated, stabilized ground bran and germ component or fraction may have a starch melting enthalpy of greater than about 2 J/g, based upon the weight of the heat treated, stabilized ground bran and germ component or fraction, as measured by differential scanning calorimetry (DSC), at a peak temperature of from about 60° C. to about 65° C. Generally, starch gelatinization occurs when: a) water in a sufficient amount, generally at least about 30% by weight, based upon the weight of the starch, is added to and mixed with starch and, b) the temperature of the starch is raised to at least about 80° C. (176° F.), preferably 100° C. (212° F.) or more. The gelatinization temperature depends upon the amount of water available for interaction with the starch. The lower the amount of available water, generally, the higher the gelatinization temperature. Gelatinization may be defined as the collapse (disruption) of molecular orders within the starch granule, manifested in irreversible changes in properties such as granular swelling, native crystallite melting, loss of birefringence, and starch solubilization. The temperature of the initial stage of gelatinization and the temperature range over which it occurs are governed by starch concentration, method of observation, granule type, and heterogeneities within the granule population under observation. Pasting is the second-stage phenomenon following the first stage of gelatinization in the dissolution of starch. It involves increased granular swelling, exudation of molecular components (i.e. amylose, followed by amylopectin) from the granule, and eventually, total disruption of the granules. See Atwell et al., "The Terminology And Methodology Associated With Basic Starch Phenomena," *Cereal Foods World*, Vol. 33, No. 3, pgs. 306-311 (March 1988).

The heat treated, stabilized whole grain flour having bran germ and endosperm obtained with the methods of the present invention exhibit superior baking functionality and protein functionality as exhibited by a lactic acid solvent retention capacity (SRC lactic acid) of greater than or equal to 65%, preferably greater than 70%, and a ratio of lactic acid SRC to sodium carbonate-water solvent retention capacity (SRC sodium carbonate) of greater than 1, preferably greater than 1.1.

In embodiments where the heating of the bran and germ component is conducted to achieve substantial gelatinization of starch contained in the bran and germ component, such as for high moisture content baked good applications such as cakes and breads, the conveying and mixing may be at high pressure and relatively high shear, in a cooker extruder, with heating being at higher moisture contents, but still low enough to achieve a sweet, caramelized flavor, and Maillard browning, without burning. In such embodiments, the ground bran and germ component subjected to heating may have a moisture content of from about 10% by weight to about 25% by weight, preferably from about 12% by weight to about 18% by weight, most preferably from about 14% by weight to about 16% by weight, based upon the weight of the ground bran and germ component. The heating of the ground bran and germ component or fraction may be from an input or feed temperature of less than about 120° F. to an exit temperature from the device of about 285° F. to about 410° F., preferably from about 300° F. to about 395° F., most preferably from about 310° F. to about 330° F. to volatilize volatile wheaty flavor or astringent components and moisture in the ground bran and germ component or fraction and to develop a buttery, nutty, caramelized flavor in the bran component. The heating and venting are performed to be sufficient for reducing the moisture content of the bran and germ component by about 30% by weight to about 75% by weight to obtain a dried ground bran and germ component or fraction leaving the cooker extruder exit die having a moisture content of from about 4% by weight to about 10% by weight, preferably from about 5% by weight to about 8% by weight, most preferably from about 6% by weight to about 7% by weight, which is critical for caramelized flavor development. The heating may be conducted for a period of time of less than about 1 minute, for example from about 10 seconds to about 35 seconds in a cooker extruder.

The cooker extrusion input, or specific mechanical energy (SME) may be from about 20 W*hr/kg to about 120 W*hr/kg, preferably from about 20 W*hr/kg to about 120 W*hr/kg, preferably about 30 W*hr/kg to about 60 W*hr/kg, most preferably from about 35 W*hr/kg to about 55 W*hr/kg. The SME may be calculated as (screw speed actual/screw speed rated) X % Torque (motor power rated/feed rate (kg/hr)

=KWH/KG. The shear rate may be from about 2000/min to about 6000/min, preferably from about 3000/min to about 5000/min, most preferably from about 3500/min to about 4500/min. The exit die pressure from the cooker extruder may range from about 200 psi to about 1500 psi, preferably from about 500 psi to about 1200 psi, most preferably from about 600 psi to about 1100 psi.

Exemplary of cooker extruders which may be employed in embodiments of the invention are manufactured by Buehler, Baker Perkins, or Werner & Pfleiderer, such as a Werner & Pfleiderer ZSK-57 extruder including twelve barrel sections, each including a heating element and cooling means, and twin screws, for feeding, mixing and conveying, kneading, blocking, and discharging of the ground bran and germ component or fraction. One or more of the extruder barrels may be vented for removal of the wheaty volatile components and moisture. The extruder may be equipped for direct steam injection or indirect steam injection.

In embodiments of the invention, the treatment temperature and treatment time, and moisture contents in the high pressure, high shear conveying and mixing device or cooker extruder may be controlled so that starch gelatinization resulting from the flavor developing heat treatment and stabilization in the heat treated, stabilized ground bran and germ component or fraction may be greater than 25%, for example from about 50% to about 85% or essentially completely or 100% gelatinized, as measured by differential scanning calorimetry (DSC). The high degree of starch gelatinization and increased degree of starch damage may be exemplified by a starch melting enthalpy of less than 4 J/g, for example, less than about 3 J/g, based upon the weight of starch in the heat treated, stabilized ground bran and germ component or fraction, as measured by differential scanning calorimetry (DSC), at a peak temperature of from about 65° C. to about 70° C. In embodiments the heat treated, stabilized ground bran and germ component or fraction may have a starch melting enthalpy of less than about 2 J/g, based upon the weight of the heat treated, stabilized ground bran and germ component or fraction, as measured by differential scanning calorimetry (DSC), at a peak temperature of from about 60° C. to about 65° C.

The heat treatment of the ground bran and germ component or fraction volatizes wheaty flavor components which include one or more lipid oxidation compounds, saturated aldehydes, and unsaturated aldehydes, such as hexanal, heptadienal, nonanal, decanal, nonenal, heptenal, 1-octen-3-one, 3,5-octadien-2-one, decadienal, nonadienal, octenal, and combinations or mixtures thereof, which are removed from the device, by venting with or without the application of vacuum, and by stripping with steam or moisture volatilization and removal. The heat treatment also produces nutty, sweet, buttery, caramelized flavor components or Maillard Reaction flavor components which include pyrazines and dimethylpyrazines which are less volatile or non-volatile at the operating conditions, and are retained by the heat treated ground bran and germ component or fraction. Venting of volatiles during the heat treatment of the bran and germ component or fraction reduces the amount of volatile compounds related to wheaty flavor and develops nutty flavor type of compounds which favorably affects the overall flavor of baked goods made with whole grain flour containing the heat treated bran and germ component or fraction. The lower levels of wheaty related compounds compared to un-stabilized, non-heat-treated bran and germ indicates that venting of volatile compounds during heat treating reduces the potential carryover of volatile compound into whole grain flours made from the heat treated bran and germ component or fraction. The wheaty related compounds (hexanal, heptadienal, nonanal, decanal, nonenal, heptenal, 1-octen-3-one, 3,5-octadien-2-one, decadienal, nonadienal, octenal, and combinations or mixtures thereof) are found to be lower in the heat treated, stabilized bran and germ component or fraction compared to untreated bran and germ components or fractions. Hexanal, heptadienal, nonanal, decanal, heptenal, 1-octen-3-one, 3,5-octadien-2-one, and octenal are perceived as rancid, nonenal is perceived at low ppb as grassy and green while nonadienal and decadienal are perceived at low ppm as fatty, rancid and cardboard in crackers and their levels are reduced in the heat treated, stabilized bran and germ component products. In embodiments, the amounts or levels of one or more of these volatile compounds in the heat treated bran and germ component or fraction may be monitored or analyzed using headspace GC-MS analysis, and the levels can be compared to the levels in an untreated bran and germ component or fraction control, and based upon the analyses, the heat treatment conditions such as temperature, moisture, treatment time, and/or SME, can be adjusted to increase their removal to reduce wheatiness and improve flavor as determined by sensory evaluation by an expert taste panel. In other embodiments, the amounts or levels of one or more of these volatile compounds in the vented gases may be monitored or analyzed periodically or continuously using headspace GC-MS analysis, and the heat treatment conditions such as temperature, moisture, treatment time, and/or SME, can be adjusted to increase their removal to reduce wheatiness and improve flavor as determined by sensory evaluation by an expert taste panel.

The ground bran and germ component or fraction treated in accordance with the flavor developing heat treatment of the present invention may be obtained from the milling of whole grains using known flour milling and/or grinding operations for obtaining a bran and germ fraction or bran component and an endosperm fraction, and for obtaining flours and fractions and components having particle size distributions such as disclosed in U.S. Patent Application Publication No. US 2005/0136173 A1 to Korolchuk, U.S. Patent Application Publication No. US 2006/0073258 A1, to Korolchuk, U.S. Patent Application Publication No. 20070292583, U.S. Pat. Nos. 8,133,527, 8,173,193, and International Patent Application Publication No. WO/2007/149320 each to Haynes et al, U.S. Patent Application Publication No. 2007/0269579 to Dreese et al and U.S. Pat. No. 7,258,888 to Dreese et al, the disclosures of which are each herein incorporated by reference in their entireties. In preferred embodiments, the flour milling and/or grinding operations for obtaining a bran and germ fraction or bran component and an endosperm fraction, and for obtaining flours and fractions and components having particle size distributions as disclosed in U.S. Patent Application Publication No. 20070292583, U.S. Pat. Nos. 8,133,527, 8,173,193, and International Patent Application Publication No. WO/2007/149320 each to Haynes et al, and U.S. Provisional Application No. 61/457,315, filed Feb. 24, 2011, and International Application No. PCT/US12/26490, filed Feb. 24, 2012, published as WO2012/148543 A1, each in the name of Derwin G. Hawley et al, all the disclosures of which are each herein incorporated by reference in their entireties, can be employed. In embodiments of the invention, stabilization by treatment with a lipase inhibitor as disclosed in International Patent Publication No. WO/2012/142399 in the name of Bin Zhao et al, the disclosure of which is herein incorporated by reference in its entirety, may be employed with the heat treatment of the present application to reduce wheaty flavors and enhance the caramelized flavor of the products produced by the methods disclosed therein.

For example, in embodiments of the invention, the milling and grinding operations as disclosed in said copending U.S. Provisional Application No. 61/457,315, filed Feb. 24, 2011, and International Application No. PCT/US12/26490, filed Feb. 24, 2012, published as WO2012/148543 A1, each in the name of Derwin G. Hawley et al, may be employed to produce a stabilized whole grain flour having a particle size distribution of 0% by weight on a No. 35 (500 micron) U.S. Standard Sieve, and less than or equal to about 20% by weight, preferably less than or equal to about 10% by weight on a No. 70 (210 micron) U.S. Standard Sieve, or a stabilized whole grain flour having a particle size distribution of up to about 100% by weight through a No. 70 (210 micron) U.S. Standard Sieve, or a stabilized whole grain flour having a particle size distribution of at least 75% by weight, preferably at least 85% by weight less than or equal to 149 microns and less than or equal to 5% by weight greater than 250 microns. In embodiments of the invention, the ground bran and germ component or fraction may have a particle size distribution of less than or equal to 15% by weight, preferably less than or equal to 12% by weight, most preferably 0% by weight on a No. 35 (500 micron) U.S. Standard Sieve, and less than or equal to about 40% by weight, for example less than or equal to about 35% by weight, preferably less than or equal to about 20% by weight, most preferably less than or equal to about 10% by weight on a No. 70 (210 micron) U.S. Standard Sieve. Also, in embodiments the ground bran and germ component or fraction may have a particle size distribution of at least about 65% o by weight, for example at least about 75% by weight, preferably at least about 85% by weight having a particle size of less than or equal to 149 microns, and less than or equal to about 15% by weight, for example less than or equal to about 10% by weight, preferably less than equal to about 5% by weight having a particle size of greater than 250 microns, and up to about 40% by weight, for example up to about 25% by weight having a particle size of greater than 149 microns but less than or equal to 250 microns. In embodiments, the ground bran and germ component or fraction may have, on a solids basis, a starch content of from about 10% by weight to about 60% by weight, for example from about 10% by weight to about 45% by weight, based upon the weight of the ground bran and germ component or fraction. The amount of the ground bran and germ component or fraction may be from about 20% by weight to about 40% by weight, generally from about 25% by weight to about 40% by weight, preferably from about 31% by weight to about 40% by weight, most preferably from about 32% by weight to about 35% by weight, based upon the total weight of the whole grain.

In other embodiments of the invention, the milling and grinding operations as disclosed in said U.S. Patent Application Publication No. 20070292583, U.S. Pat. Nos. 8,133, 527 8,173,193, and International Patent Application Publication No. WO/2007/149320 each to Haynes et al may be employed to produce a stabilized whole grain flour having a particle size distribution of less than about 10% by weight, preferably less than about 5% by weight on a No. 35 (500 micron) U.S. Standard Sieve, about 20% by weight to about 40% by weight on a No. 60 (250 micron) U.S. Standard Sieve, about 10% by weight to about 60% by weight, preferably from about 20% by weight to about 40% by weight on a No. 100 (149 micron) U.S. Standard Sieve, and less than about 70% by weight, for example from about 15% by weight to about 55% by weight, through a No. 100 (149 micron) U.S. Standard Sieve. The ground or milled bran and germ component or fraction employed may contain bran in an amount of at least about 50% by weight, based upon the weight of the ground coarse fraction. The amount of germ present in the ground coarse fraction or bran component may be about the same relative amount to the bran as it is in the intact grain. The amount of starch or endosperm present in the ground coarse fraction, may be less than about 40% by weight, but generally at least about 10% by weight starch or endosperm, for example from about 15% by weight to about 35% by weight starch, preferably less than or equal to about 30% by weight, based upon the weight of the ground coarse fraction. In preferred embodiments, the ground coarse fraction may contain at least about 60% by weight bran, and at least about 10% by weight germ, based upon the weight of the ground coarse fraction. The ground or milled bran and germ component or fraction may have a particle size distribution of at least about 40% by weight of the fraction or component having a particle size greater than or equal to 149 microns, and less than or equal to about 35% by weight having a particle size greater than or equal to 500 microns. In other embodiments, the ground or milled coarse fraction or bran component may have a particle size distribution of about 0.5% by weight to about 5% by weight greater than or equal to 841 microns, about 10% by weight to about 30% by weight less than 841 microns but greater than or equal to 500 microns, about 25% by weight to about 70% by weight greater than or equal to 149 microns but less than 500 microns, and less than or equal to about 60% by weight less than 149 microns, with the percentages adding up to a total of 100% by weight. More preferably, the ground or milled coarse fraction or bran component may have a particle size distribution of about 0.5% by weight to about 5% by weight greater than or equal to 841 microns, about 15% by weight to about 25% by weight less than 841 microns but greater than or equal to 500 microns, about 45% by weight to about 60% by weight greater than or equal to 149 microns but less than 500 microns, and from about 10% by weight to about 30% by weight less than 149 microns, with the percentages adding up to a total of 100% by weight.

Whole cereal grains with moisture contents of from about 8% to about 15% by weight may be employed, with moisture contents of about 10% by weight to about 14.5% by weight being preferred for milling or grinding purposes, and moisture contents of about 12.5% by weight to about 13.5% by weight being particularly preferred. If there is too little moisture in the grains, the grains may undesirably shatter and create damaged starch. Too high an amount of moisture may render the grains susceptible to excessive starch gelatinization and may also cause the grains to be difficult to mill or grind. For these reasons, grain moisture contents of from about 10% by weight to about 14.5% by weight are preferred just prior to milling. If the moisture content of the grains is too low, moisture may be added to the dry grains prior to milling to increase the moisture content to an acceptable level for milling. Moisture addition may be achieved by tempering the grains in an aqueous solution or spraying their surfaces with an aqueous solution and permitting them to soak for sufficient amount of time to allow absorption and distribution of the water throughout the bran and germ.

Whole grains contain primarily the endosperm, bran, and germ, in diminishing proportions, respectively. In whole wheat grains, for example, at field moisture of about 13% by weight, the endosperm or starch is about 83% by weight, the bran is about 14.5% by weight, and the germ is about 2.5% by weight, based upon the weight of the intact grain. The endosperm contains the starch, and is lower in protein content than the germ and the bran. It is also low in crude fat and ash constituents. The bran (pericarp or hull) is the mature ovary wall which is beneath the cuticle, and comprises all the outer cell layers down to the seed coat. It is high in non-starch-polysaccharides, such as cellulose and pentosans. The bran or pericarp tends to be very tough due to its high fiber content and imparts a dry, gritty mouthfeel, particularly when present in large particle sizes. It also contains most of the lipase and lipoxygenase of the grain and needs to be stabilized. As the extent of the grinding or milling increases, the bran particle size approaches the particle size of the starch, making the bran and starch harder to separate. Also, starch damage tends to increase due to more mechanical energy input, and abrasiveness of the bran compared to the endosperm, and rupturing of the starch granules. Also, mechanically damaged starch tends to be more susceptible to gelatinization. The germ is characterized by its high fatty oil content. It is also rich in crude proteins, sugars, and ash constituents.

In embodiments of the invention, the moisture content of the bran fraction may be controlled by tempering the whole grains such that exterior portions of the berries or grains are moistened without substantially moistening interior portions thereof. Such treatment avoids or substantially reduces the need to dry the fine fraction obtained from the interior or endosperm of the berry or grain, while moistening the exterior or bran and germ portions of the berry for stabilization treatment. Tempering methods which can be used to accomplish a surface or bran moistening include soaking the whole grains for limited time periods in a bath or vat, for example. In other embodiments, the whole grains may be surface sprayed with water and permitted to temper. Tempering times of from about 10 minutes to about 24 hours may be employed according to some embodiments of the invention. Soaking the grains for a longer time period is not desirable because it may result in deep penetration of water into the grain, moistening the interior portion of the grain, and resulting in excessive starch gelatinization.

In other embodiments, one or more bran and germ fractions, or a bran component, rather than or in addition to the whole grain may be moistened so as to achieve a desired moisture content in the bran and germ fraction or bran component. In embodiments of the invention, the bran and germ fraction or bran component may be hydrated to such an extent with an aqueous solution so that the hydrated bran and germ component or fraction has a desired moisture content prior to heat treatment for flavor development and stabilization.

In embodiments of the invention, the heat-treated bran and germ component or fraction may be permitted to cool in ambient air. In other embodiments, cooling after heat treatment may optionally be controlled using conventional cooling equipment to further minimize undesired gelatinization of starch. Generally, no further significant gelatinization occurs in the heat treated bran and germ component or fraction at temperatures lower than about 60° C. Then the heat-treated bran and germ component or fraction may be cooled to room temperature, or about 25° C.

In other embodiments of the invention, a heat treated, stabilized bran and germ component or fraction may be combined with the endosperm fraction to obtain a stabilized whole grain flour, such as a stabilized whole grain wheat flour, of the present invention. The stabilized whole grain flour, such as stabilized whole grain wheat flour, includes bran, germ and endosperm. The heat treated bran and germ component or fraction is preferably derived from the same whole grains from which the endosperm fraction is derived. However, in other embodiments, the heat treated bran and germ component or fraction may be combined or blended with an endosperm fraction which is derived or obtained from a different source of grains. In each embodiment however, the heat treated, stabilized bran and germ component or fraction and the endosperm fraction are combined or blended so as to provide a stabilized whole grain flour which contains endosperm, bran and germ in the same or substantially the same relative proportions as they exist in the intact grain.

The heat treated, stabilized ground bran and germ component or fraction may be blended, combined, or admixed with the endosperm fraction using conventional metering and blending apparatus known in the art to obtain an at least substantially homogeneous stabilized whole grain flour with substantially reduced or no wheaty flavor, but with nutty, buttery sweet, browned, caramelized flavor. Exemplary of mixing or blending devices which may be employed include batch mixers, rotating drums, continuous mixers, and extruders.

The moisture content of the stabilized whole grain flour, such as stabilized whole grain wheat flour, may range from about 10% by weight to about 14.5% by weight, based upon the weight of the stabilized whole grain flour, and the water activity may be less than about 0.7. In embodiments, the stabilized whole grain wheat flour may have a protein content of from about 10% by weight to about 14% by weight, for example about 12% by weight, a fat content of from about 1% by weight to about 3% by weight, for example about 2% by weight, and an ash content of from about 1.2% by weight to about 1.7% by weight, for example about 1.5% by weight, each of the percentages being based upon the weight of the stabilized whole grain flour.

The stabilized whole grain wheat flour containing the heat treated ground bran and germ component or fraction having a low degree of starch gelatinization, produced using a low pressure conveying and mixing device, such as a Bepex Turbulizer® continuous high shear paddle mixer, exhibits excellent baking functionality where an oven spread or cookie spread may be at least about 130% of the original prebaked dough diameter, as measured according to the AACC 10-53 bench-top method.

The embodiments disclosed are applicable to any and all types of wheat. Although not limited thereto, the wheat berries may be selected from soft/soft and soft/hard wheat berries. They may comprise white or red wheat berries, hard wheat berries, soft wheat berries, winter wheat berries, spring wheat berries, *durum* wheat berries, or combinations thereof. Examples of other whole grains that may be processed in accordance with various or certain embodiments or aspects of this invention include, for example, oats, corn, rice, wild rice, rye, barley, buckwheat, bulgar, millet, sorghum, and the like, and mixtures of whole grains.

Embodiments of the invention provide an improved raw material stability and flavor, and greater than one month shelf life, for example 2 months or more, under accelerated storage conditions, for a stabilized bran and germ component or fraction or ingredient and for a stabilized whole grain flour, such as stabilized whole grain wheat flour. A more stable food product can be stored under similar conditions for a longer period of time than a less stable food product before going rancid. The presence of rancidity can be monitored and measured in a multiplicity of different manners, including sensory testing (e.g., taste and/or odor analysis), lipoxygenase or lipase activity level measurements, free fatty acid level measurements, and/or hexanal level measurements.

In other embodiments of the invention, the heat treated ground bran and germ component or fraction or the stabilized whole grain flour, such as stabilized whole grain wheat flour, may be combined, admixed, or blended with refined wheat flour to obtain a fortified flour, product or ingredient, such as fortified wheat flour. The fortified wheat flour product may contain the heat treated, stabilized bran and germ component or fraction or the stabilized whole grain flour, such as stabilized whole grain wheat flour, in an amount of from about 14% by weight to about 40% by weight, for example from about 20% by weight to about 30% by weight, based upon the total weight of the fortified flour product, such as fortified wheat flour product.

The stabilized whole grain flour, such as stabilized whole grain wheat flour, may be employed to partially or completely replace refined wheat flour, or other flours, in a variety of food products. For example, in embodiments of the invention, at least about 10% by weight, at most 100% by weight, for example from about 30% by weight to about 50% by weight of the refined wheat flour, may be replaced by the stabilized whole grain wheat flour to increase nutritional values of refined wheat flour products with little, if any detriment to product appearance, texture, aroma, or taste.

The heat treated, stabilized bran and germ components or fractions and stabilized whole grain products, such as stabilized whole grain wheat products, obtained in an embodiment of the invention can be packaged, stably stored, and subsequently or immediately further used in food production. The stabilized bran products and flour products are ready for further processing into the finished food products by adding water and other applicable food ingredients, mixing, shaping, and baking or frying, etc. Doughs containing the heat treated stabilized bran and germ components or fractions and whole grain flours, such as whole grain wheat flour, may be continuously produced and machined, for example sheeted, laminated, molded, extruded, or coextruded, and cut, on a mass production basis. The finished whole grain products (e.g., biscuits, cookies, crackers, snack bars, etc.) have a pleasant, non-grainy texture with the characteristics of a nutty, sweet, browned, caramelized taste.

The heat treated, stabilized ground bran and germ components or fractions and stabilized whole-grain flour products, such as stabilized whole-grain wheat flour products, of the present invention may be used in a wide variety of food products. The food products include farinaceous food products, and biscuit type products in particular, pasta products, ready-to-eat cereals, and confections. In one embodiment, the food products may be bakery products or snack foods. The bakery products may include cookies, crackers, pizza crusts, pie crusts, breads, bagels, pretzels, brownies, muffins, waffles, pastries, cakes, quickbreads, sweet rolls, donuts, fruit and grain bars, tortillas, and par-baked bakery products. The snack products may include snack chips and extruded, puffed snacks. The food product particularly may be selected from cookies, crackers, and cereal crunch bars. The cookies may be bar-type products, extruded, coextruded, sheeted and cut, rotary molded, wire cut, or sandwich cookies. Exemplary of cookies which may be produced include sugar wafers, fruit filled cookies, chocolate chip cookies, sugar cookies, and the like. The crackers may be fermented or non-fermented type crackers, and graham crackers. The baked goods produced may be crackers or cookies having a full fat content or they may be a reduced fat, low-fat, or no-fat product.

In addition to water, cookie, cracker, and snack ingredients which may be admixed with the stabilized whole grain flour, such as stabilized whole grain wheat flour, include enriched wheat flour, vegetable shortening, sugar, salt, high fructose corn syrup, leavening agents, flavoring agents and coloring agents. Enriched wheat flours which may be used include wheat flours enriched with niacin, reduced iron, thiamine mononitrate and riboflavin. Vegetable shortenings which may be used include those made of partially hydrogenated soybean oil. Leavening agents which may be used include calcium phosphate and baking soda. Coloring agents which may be used include vegetable coloring agents such as annatto extract and turmeric oleoresin.

In some embodiments, the dough made includes dough comprising various combinations of the aforementioned cookie, cracker, and snack ingredients. According to some embodiments, all of the foregoing ingredients are homogeneously admixed and the amount of water is controlled to form a dough of desired consistency. The dough may then be formed into pieces and baked or fried to produce products having excellent moisture, geometry, appearance, texture, and flavor attributes.

In embodiments of the invention, the total amount of the flour component, such as the stabilized whole grain flour and optional other flours which may be used in the baked good compositions, such as cookies, biscuits and crackers, of the present invention may range, for example, from about 20% by weight to about 80% by weight, preferably from about 45% by weight to about 75% by weight, based upon the weight of the dough, not including the weight of inclusions. Unless otherwise indicated, all weight percentages are based upon the total weight of all ingredients forming the doughs or formulations, except for inclusions such as confectionary or flavor chips or chunks, nuts, raisins, and the like. Thus, "the weight of the dough" does not include the weight of inclusions, but "the total weight of the dough" does include the weight of inclusions.

Process-compatible ingredients, which can be used to modify the texture of the products produced, include sugars such as sucrose, fructose, lactose, dextrose, galactose, maltodextrins, corn syrup solids, hydrogenated starch hydrolysates, protein hydrolysates, glucose syrup, mixtures thereof, and the like. Reducing sugars, such as fructose, maltose, lactose, and dextrose, or mixtures of reducing sugars may be used to promote browning. Exemplary sources of fructose include invert syrup, high fructose corn syrup, molasses, brown sugar, maple syrup, mixtures thereof, and the like.

The texturizing ingredient, such as sugar, may be admixed with the other ingredients in either solid or crystalline form, such as crystalline or granulated sucrose, granulated brown sugar, or crystalline fructose, or in liquid form, such as sucrose syrup or high fructose corn syrup. In embodiments of the invention, humectant sugars, such as high fructose corn syrup, maltose, sorbose, galactose, corn syrup, glucose syrup, invert syrup, honey, molasses, fructose, lactose, dextrose, and mixtures thereof, may be used to promote chewiness in the baked product.

In addition to the humectant sugars, other humectants, or aqueous solutions of humectants which are not sugars or possess a low degree of sweetness relative to sucrose, may also be employed in the dough or batter. For example, glycerol, sugar alcohols such as mannitol, maltitol, xylitol and sorbitol, and other polyols, may be used as humectants.

Additional examples of humectant polyols (i.e. polyhydric alcohols) include glycols, for example propylene glycol, and hydrogenated glucose syrups. Other humectants include sugar esters, dextrins, hydrogenated starch hydrolysates, and other starch hydrolysis products.

In embodiments, the total sugar solids content, or the texturizing ingredient content, such as of the doughs produced, may range from zero up to about 50% by weight, based upon the weight of the dough, not including the weight of inclusions.

The sugar solids may be replaced in whole or in part by a conventional sugar substitute or conventional bulking agent such as polydextrose, hollocellulose, microcrystalline cellulose, mixtures thereof, and the like. Polydextrose is a preferred sugar substitute or bulking agent for making reduced calorie baked goods. Exemplary replacement amounts may be at least about 25% by weight, for example at least about 40% by weight, preferably from about 50% by weight to about 75% by weight, of the original sugar solids content.

In embodiments, the amount of the conventional sugar substitute, conventional bulking agent, or conventional flour substitute, such as polydextrose, may be from about 10% by weight to about 35% by weight, for example from about 15% by weight to about 25% by weight, based upon the weight of the dough, not including the weight of the inclusions.

The moisture contents of the doughs should be sufficient to provide the desired consistency to enable proper forming, machining, and cutting of the dough. The total moisture content of the doughs will include any water included as a separately added ingredient, as well as the moisture provided by flour (which usually contains about 12% to about 14% by weight moisture), the moisture content of any bulking agent or flour substitute such as a resistant starch type III ingredient, and the moisture content of other dough additives included in the formulation, such as high fructose corn syrup, invert syrups, or other liquid humectants.

Taking into account all sources of moisture in the dough or batter, including separately added water, the total moisture content of the doughs or batters which may be used is generally less than about 50% by weight, preferably less than about 35% by weight, based upon the weight of the dough or batter, not including the weight of the inclusions. For example, cookie doughs employed may have a moisture content of less than about 30% by weight, generally from about 10% by weight to about 20% by weight, based upon the weight of the dough, not including the weight of inclusions.

Oleaginous compositions which may be used to obtain the doughs and baked goods of the present invention may include any known shortening or fat blends or compositions, useful for baking applications, such as butter, and they may include conventional food-grade emulsifiers. Vegetable oils, lard, marine oils, and mixtures thereof, which are fractionated, partially hydrogenated, and/or interesterified, are exemplary of the shortenings or fats which may be used in the present invention. Edible reduced- or low-calorie, partially digestible or non-digestible fats, fat-substitutes, or synthetic fats, such as sucrose polyesters or triacyl glycerides, which are process-compatible may also be used. Mixtures of hard and soft fats or shortenings and oils may be used to achieve a desired consistency or melting profile in the oleaginous composition. Exemplary of the edible triglycerides which can be used to obtain the oleaginous compositions for use in the present invention include naturally occurring triglycerides derived from vegetable sources such as soybean oil, palm kernel oil, palm oil, rapeseed oil, safflower oil, sesame oil, sunflower seed oil, and mixtures thereof. Marine and animal oils such as sardine oil, menhaden oil, babassu oil, lard, and tallow may also be used. Synthetic triglycerides, as well as natural triglycerides of fatty acids, may also be used to obtain the oleaginous composition. The fatty acids may have a chain length of from 8 to 24 carbon atoms. Solid or semi-solid shortenings or fats at room temperatures of, for example, from about 75° F. to about 95° F. may be used. Preferred oleaginous compositions comprise soybean oil. In embodiments, the dough may include up to about 30% by weight, for example from about 5% by weight to about 25% by weight of at least one oil or fat, based upon the weight of the dough.

Baked goods which may be produced in accordance with embodiments of the invention include reduced calorie baked goods which are also reduced fat, low fat or no-fat products. As used herein, a reduced-fat food product is a product having its fat content reduced by at least 25% by weight from the standard or conventional product. A low-fat product has a fat content of less than or equal to three grams of fat per reference amount or label serving. However, for small reference amounts (that is, reference amounts of 30 grams or less or two tablespoons or less), a low-fat product has a fat content of less than or equal to 3 grams per 50 grams of product. A no-fat or zero-fat product has a fat content of less than 0.5 grams of fat per reference amount and per label serving. For accompaniment crackers, such as a saltine cracker, the reference amount is 15 grams. For crackers used as snacks and for cookies, the reference amount is 30 grams. Thus, the fat content of a low-fat cracker or cookie would therefore be less than or equal to 3 grams of fat per 50 grams or less than or equal to about 6% fat, based upon the total weight of the final product. A no-fat accompaniment cracker would have a fat content of less than 0.5 grams per 15 grams or less than about 3.33%, based upon the weight of the final product.

In addition to the foregoing, the doughs may include other additives conventionally employed in crackers and cookies. Such additives may include, for example, milk by-products, egg or egg by-products, cocoa, vanilla or other flavorings, in conventional amounts.

A source of protein, which is suitable for inclusion in baked goods, may be included in the doughs employed to promote Maillard browning. The source of protein may include non-fat dry milk solids, dried or powdered eggs, mixtures thereof, and the like. The amount of the proteinaceous source may, for example, range up to about 5% by weight, based upon the weight of the dough, not including the weight of inclusions.

The dough compositions may contain up to about 5% by weight of a leavening system, based upon the weight of the dough, not including inclusions. Exemplary of chemical leavening agents or pH-adjusting agents which may be used include alkaline materials and acidic materials such as sodium bicarbonate, ammonium bicarbonate, calcium acid phosphate, sodium acid pyrophosphate, diammonium phosphate, tartaric acid, mixtures thereof, and the like. Yeast may be used alone or in combination with chemical leavening agents.

The doughs employed may include antimycotics or preservatives, such as calcium propionate, potassium sorbate, sorbic acid, and the like. Exemplary amounts, to assure microbial shelf-stability, may range up to about 1% by weight of the dough, not including the weight of inclusions.

Emulsifiers may be included in effective, emulsifying amounts in the doughs. Exemplary emulsifiers which may be used include mono- and di-glycerides, polyoxyethylene sorbitan fatty acid esters, lecithin, stearoyl lactylates, and mixtures thereof. Exemplary of the polyoxyethylene sorbitan fatty acid esters which may be used are water-soluble polysorbates such as polyoxyethylene (20) sorbitan monostearate (polysorbate 60), polyoxyethylene (20) sorbitan monooleate (polysorbate 80), and mixtures thereof. Examples of natural lecithins which may be used include those derived from plants such as soybean, rapeseed, sunflower, or corn, and those derived from animal sources such as egg yolk. Soybean-oil-derived lecithins are preferred. Exemplary of the stearoyl lactylates are alkali and alkaline-earth stearoyl lactylates such as sodium stearoyl lactylate, calcium stearoyl lactylate, and mixtures thereof. Exemplary amounts of the emulsifier which may be used range up to about 3% by weight of the dough, not including the weight of inclusions.

Production of the doughs may be performed using conventional dough mixing techniques and equipment used in the production of cookie and cracker doughs.

While baking times and temperatures will vary for different dough or batter formulations, oven types, etc., in general, commercial cookie, brownie and cake-baking times may range from about 2.5 minutes to about 15 minutes, and baking temperatures may range from about 250° F. (121° C.) to about 600° F. (315° C.).

The baked products may have a relative vapor pressure ("water activity") of less than about 0.7, preferably less than about 0.6, for preservative free microbial shelf-stability. Cookie, brownie and cake products generally have a moisture content of less than about 20% by weight, for example, from about 2% by weight to about 9% by weight for cookies, based upon the weight of the baked product, exclusive of inclusions.

For example, in embodiments of the invention, a dough for producing a shelf-stable cracker or cookie, such as a graham cracker may include from about 40% by weight to about 65% by weight of stabilized whole grain wheat flour, from about 15% by weight to about 25% by weight of at least one sugar such as sucrose, from about 5% by weight to about 25% by weight of at least one oil or fat such as vegetable oil or shortening, from about 0% by weight to about 10% by weight of at least one humectant sugar such as high fructose corn syrup and honey, from about 0% by weight to about 1% by weight of a protein source such as non-fat dry milk solids, from about 0% by weight to about 1% by weight of a flavoring, such as salt, from about 0.5% by weight to about 1.5% by weight of leavening agents, such as ammonium bicarbonate and sodium bicarbonate, and from about 8% by weight to about 20% by weight of added water, where each weight percentage is based upon the weight of the dough, and the weight percentages add up to 100% by weight.

Bran and Germ Component and Flour Attributes

The heat treatment of the ground bran and germ component or fraction in the production of stabilized whole grain flour provides stabilized ground bran and germ components or fractions and whole grain flours with:
a) extended superior freshness as measured by free fatty acids (FFA) and/or hexanal formed in the ground bran and germ components or fractions or flour during storage,
b) superior sensory attributes, such as reduced wheaty flavor, reduced hay taste, reduced grainy or particulate texture, and increased sweet, buttery, nutty, caramelized, browned flavor, and
c) superior microbial stability as measured by spore counts, each compared to ground bran and germ components or fractions and whole grain flours produced without high temperature, low moisture heat treatment and venting.

In embodiments, the stabilized whole grain wheat flours may exhibit an unexpectedly low hexanal content of less than about 200 ppm, preferably less than about 100 ppm, most preferably less than about 10 ppm after 1 month accelerated storage at 95° C., based upon the weight of the stabilized whole grain flour.

Also, in embodiments, wheaty flavor and grainy texture may be reduced, and sweet, buttery, nutty, brown, caramelized flavor may be increased compared to a control produced without high temperature, low moisture heat treatment and venting by at least 3%, for example by at least 5%, preferably at least 7%, most preferably at least 10%, based upon sensory evaluation by an expert taste panel using a score or scale of 1 to 100 where a rating of 1 has the lowest intensity, and a rating of 100 has the highest intensity of wheaty flavor or grainy texture, or sweet, nutty, buttery, browned, or caramelized flavor. The percentage reduction or percentage increase, or score may depend upon the treatment conditions such as bran and germ component initial moisture content, heat treatment temperature, and extent of moisture removal and venting.

Baked Good Sensory Attributes

Moreover, baked goods, such as cookies, produced using the heat treated bran and germ component or fraction, and stabilized whole grain flour containing it, exhibit extended superiorly reduced wheaty flavor and grainy texture, and superiorly improved sweet, nutty, buttery, browned, or caramelized flavor development and retention and other sensory attributes, such as aftertaste compared to those of baked goods or control samples containing the same composition but made with whole grain flour produced without the high temperature, low moisture heat treatment and venting.

For example, in embodiments, baked good sensory attributes, such as positive sensory attributes of sweet, nutty, buttery, browned, or caramelized flavor for a cookie or graham cracker may be increased, and negative sensory attributes of wheaty flavor and grainy texture may be decreased, compared to a control produced without high temperature, low moisture content heat treatment by at least 3%, for example at least 5%, preferably at least 7%, most preferably at least 10%, based upon sensory evaluation by an expert taste panel using a scale of 1 to 100 where a rating of 1 has the lowest intensity, and a rating of 100 has the highest intensity of the attribute such as sweet flavor nutty, buttery, browned, or caramelized flavor etc. The percentage increase or percentage reduction, or score may depend upon the treatment conditions such as bran and germ component moisture content, heat treatment temperature, amount of moisture reduction and amount of venting of volatile components.

Also, in embodiments, baked goods, such as cookies, produced with the heat treated ground bran and germ component or fraction and stabilized whole grain flours containing it may have a score of greater than 29.5 for the positive attribute of nutty flavor, based upon a scale of 1 to 100, depending on treatment conditions such as the moisture content and temperature, compared to a control score of less than 29 for a control sample made with whole grain flour produced without stabilization treatment or produced using stabilization alone without high temperature low moisture and without venting. Also, based upon a scale of 1 to 100, the baked good may have a score for the positive sensory attributes of buttery flavor of greater than 20, baked flavor of greater than 38, sweet flavor of greater than 22.5, and brown color of greater than 37, and a score for the negative sensory attributes of wheat flavor of less than 34, and amount of dryness of less than 56.5.

Exemplary sensory attributes which may be evaluated to show similar improvements include categories such as aroma, appearance, hand touch, texture/mouthfeel, flavor, and aftertaste/aftereffect. Exemplary of specific sensory attributes within these categories which may be evaluated are:

a) Aroma: sweet, nutty, oil, wheat, baked, and corn, attributes;

b) Appearance: Brown color, edge color, and opposite contrast attributes;

c) Hand Touch: Crumbs, surface roughness, and oily attributes;

d) Texture/Mouthfeel: Initial bite hardness, crumbly, dry, crunchy, dissolve rate, noticeable particulates, sticks to teeth, and mouth coating, attributes;

e) Flavor: Overall, salt, sweet, wheat, nutty, oil, corn, baked, and butter attributes; and f) Aftertaste/Aftereffect: Oil, wheat, sticks to teeth, mouth drying, sweet, bitter, corn, mouth coating, salivating, and linger attributes.

The present invention is illustrated by the following non-limiting examples wherein all parts, percentages, and ratios are by weight, all temperatures are in ° C., and all temperatures are atmospheric, unless indicated to the contrary:

EXAMPLE 1

Part A. Production of Low Pressure Heat Treated Bran and Germ Component with Venting Process In this Example, a ground bran and germ component or fraction is hydrated to various amounts and heat treated at various temperatures in a low pressure convey8ing and mixing device with venting, and the moisture content after heat treatment and venting is determined. The treated bran and germ components or fractions are combined with an endosperm fraction to obtain whole grain flours and the moisture contents and lipase activities are determined and compared to those of a control.

The ground bran and germ component or fraction having an initial moisture content of about 8.29% by weight, is hydrated to about 16.29% by weight and about 26.29% by weight moisture content in a Hobart Mixer (A-200 T, Troy, Ohio) by spraying water into the mixer during mixing at low speed. After completing the water addition, mixing is continued for about 5 minutes.

An Acrison volumetric feeder with a 2" ribbon screw (Acrison Feeder Model 10152-H) was used to maintain an average nominal 6.71 kg/hr feed rate of material into a Bepex Turbulizer® (Turbulizer® Model TCJS-8). The configuration for the Turbulizer® paddles was set up with the first 12 paddles forward at 45°, then the next 20 paddles backward at 45°, and the last 8 paddles were flat or horizontal as shown in Table 1:

TABLE 1

Turbulizer ® Paddle Configuration

| Row | 1 | 2 | 3 | 4 | 5 | 6 | 7 | 8 | 9 | 10 |
|---|---|---|---|---|---|---|---|---|---|---|
| 1 | \ | \ | \ | / | / | / | / | / | — | — |
| 2 | \ | \ | \ | / | / | / | / | / | — | — |
| 3 | \ | \ | \ | / | / | / | / | / | — | — |
| 4 | \ | \ | \ | / | / | / | / | / | — | — |

The Turbulizer® rotor speed was set to 1420 rpm. The bran and germ can have 4 minutes retention time in the Turbulizer® at the above given setting.

Steam was injected directly into the Turbulizer® through a hollow shaft with three hollow paddles. Steam was generated by heating water with 60 psi jacket steam, a water flow rate of 2.15 kg/hr with a water tank pressure at 50 psi, and back steam pressure at 20 psi. The Turbulizer® was heated with jacket hot oil which was provided through a Mokon pump operating at a speed of 35 rpm, and with 18.5 psi hot oil pressure. Jacket temperatures ranging from 355° F. to 430° F. were used during testing.

The Turbulizer treated bran and germ was discharged into a sealed 100 lb plastic bucket, having a vacuum pipe connected to the top of the bucket. This helped to pull out vented wheaty notes and some condensed moisture.

Part B: Whole Grain Flour and Bran & Germ Characterization

After the low pressure heat treatment processing in the Bepex Turbulizer®, the heat treated bran and germ component or fraction was recombined with remaining flour fractions (break flour+reduction flour) or endosperm in a 32/68 ratio to form a whole grain flour.

Whole grain flour moisture content and heat bran and germ component or fraction moisture contents were determined according to AACC Method 44-15A. Extractable lipase activity was determined for each flour. Table 2 shows the whole grain flour characteristics of: (1) Bran and germ component or fraction moisture content, (2) Whole grain flour moisture content, (3) Whole grain flour lipase activity, and (4) treatment temperature:

TABLE 2

Bran & germ component, and whole grain flour moisture after Bepex heat treatment

| Run | B&G moisture after hydration and before Bepex treatment (wt %) | Jacket temp. (° F.) | Treated B&G moisture (wt %) | Treated WG flour moisture (wt %) | WG flour lipase activity (U/g) |
|---|---|---|---|---|---|
| 1 | 16.29 | 355 | 3.08 | 10.07 | 180.41 |
| 2 | 16.29 | 430 | 2.18 | 9.77 | 83.36 |
| 3 | 26.29 | 355 | 3.42 | 10.41 | 172.56 |
| 4 | 26.29 | 430 | 2.10 | 9.62 | 80.89 |
| WG Recon | 8.29 | | 8.29 | 11.71 | 471.44 |
| G3SWS | | | | 11.21 | 164.40 |

* WG Recon: untreated bran and germ reconstituted with endosperm;
* G3SWS: a commercial stabilized finely ground whole grain flour produced by Mondelēz International, Toledo, Ohio.

As shown in Table 2, the moisture of the Bepex heat treated bran and germ component or fraction of runs 1 to 4 (the bran and germ was hydrated to about 16% or 26% by weight moisture content before the Bepex heat treatment process) was significantly reduced and significantly lower (final moisture content ranging from about 2 to about 4% by weight) compared to untreated bran and germ (8.29% by weight moisture content). However, the final whole grain flour moisture content is still close to the moisture content of the untreated whole grain flour and the commercial whole grain flour. The highest hydration level resulted in 22.87% by weight to 24.19% by weight moisture venting depending on jacket temperature, while the lower hydration level resulted in 13.21% by weight to 14.11% by weight moisture vented.

The Bepex treatment of the bran and germ results in a reduction of the recombined whole grain flour lipase activity (from 471.44 U/g down to 80.89U/g to 180.41 U/g), with the highest jacket temperature (430° F.), reducing the lipase activity down to 80.89 U/g. Compared to a commercial whole grain flour lipase activity (164.40 U/g), the bran and germ component or fraction heat treatment process in this example can result in a lower lipase activity, more stabilized whole grain flour.

The method used to determine lipase activity is:

Lipase Activity Determination Method:

Extractable lipase activity was determined for each flour. The method used to determine lipase activity is as follows.

A. Apparatus
   1.1 TD-700 Fluorometer (Turner Design) with filters of Em 442 and Ex 300 nm
   1.2 Analytical balance (±0.0001)
   1.3 Pipetman, 10 µl, 50 µl and 5000 µl and tips for each
   1.4 20 ml glass scintillation vials with caps (VWR #66022-060)
   1.5 50 ml centrifuge tubes (VWR #20170-170)
   1.6 Refrigerated centrifuge (Beckman Allegra X15R)
   1.7 25 and 1000 ml volumetric flask with stopper
   1.8 1500 ml beaker
   1.9 Stir bars
   1.10 Vortex mixer
   1.11 Disposable cuvettes, 4.5 ml (VWR #58017-875)
   1.12 Caps for disposable cuvettes (VWR #24775-083)
   1.13 Insulated ice pan (VWR #35751-046)
   1.14 Shaker/rocker (VWR #14003-580)
   1.15 Timer B. Reagents
   1. Deionized water
   2. 4-Methylumbelliferyl heptanoate (4-MUH) (Sigma #M2514)
   3. 2-Methoxyethanol (Fluka #64719)
   4. Trizma Hydrochloride (Sigma #T-5941)
   5. 1 N Sodium Hydroxide (Fisher #SS266)
   6. Ice C. Solutions
   1. Assay Buffer (0.2 M Tris HCl, pH 7.4)
      Weigh 31.52 g trizma hydrochloride (B-5) into a 1500 ml beaker (A-8)
      Add about 900 ml deionized water, add stir bar, dissolve
      Adjust pH to 7.4 with 1 N sodium hydroxide
      Transfer to 1000 ml volumetric flask (A-7) and bring to volume with deionized water
   2. Substrate Stock Solution (0.5% 4-MUH in 2-methoxyethanol, W/V)
      Weigh 0.0720 to 0.0725 g 4-methylumbelliferyl heptanoate (B-2) into a 20 ml vial (A-4)
      Add 15 ml 2-methoxyethanol (B-3) to vial
      Vortex to dissolve powder
      Store at room temperature and discard after one week
   3. Substrate Working Solution (0.03% 4-MUH (W/V) in 6% 2-methoxyethanol (V/V) aqueous solution)
      Remove a 1.5 ml aliquot from Substrate Stock Solution (C-2) and pipette into a 25 ml volumetric flask (A-7)
      Dilute to volume with DI water
      Mix thoroughly.
      Make fresh Substrate Working Solution from Substrate Stock (C-2) for every test.
   4. Ice/Water Mixture (Ice Bath)
      Place ice in insulated pan (A-13) and add about half volume of cold water
   5. Flour Sample Solutions
      Pre-cool Assay Buffer (C-1) in Ice Bath (C-4)
      Weigh 0.1 g sample (as close as to 0.1000 g) into a 50 ml centrifuge tube (A-5)
      Add 20 ml chilled Assay Buffer (C-1)
      Vortex to dissolve
      Place the tube horizontally in Ice Bath and slow rock on shaker (A-14) (#2 speed setting, 16 stroke/min) for 30 min
      Centrifuge samples at 4750 rpm (A-6), 5° C. for 10 minutes
      Use supernatant for assay D. Calibration of Fluorometer (Reference to TD-700 Operating Manual for Calibration, Multi-Optional, Raw Fluorescence Procedure)
   Turn on fluorometer (wait until Home Screen appears)
   Press <ENT> from "HOME" screen for Setup&Cal
   Choose #2 for Calibration
   Place cuvette containing 3000 µl Assay Buffer (C-1, room-temperature) into sample chamber
   Press <ENT>
   Press #1 for OK for Set Sample=100 (default setting of 100, wait until Sensitivity Factor is established, the reading should be around 100)
   Press <ENT>
   Press #9 for No Subtract Blank (returning to Home screen)

E. Sample Testing
   Pre-label cuvettes (A-11) with appropriate sample ID
   Add 10 µl Substrate Working Solution (C-3) to the cuvette previously used to calibrate instrument (D-3) as Blank
   Cap (A-12) and invert 5 times to mix
   Place the cuvette in sample compartment in fluorometer (A-1)
   Start timer immediately after closing the lid on the fluorometer and record
   fluorescence intensity (FI) reading at the following intervals of 0.5, 1, 2, 3, 4, and 5 min Remove cuvette from sample compartment in fluorometer
   Pipette 2950 µl Assay Buffer (C-1, room-temperature) into first pre-labeled sample cuvette (E-1)
   Pipette 50 µl supernatant solution of first extracted flour sample(C-5)
   Add 10 µl Substrate Working Solution (C-3)
   Repeat Step E-3 through E-6 for all subsequent samples immediately F. Calculations
   Plot FI values vs. incubation time for each sample as reaction curve
   Determine slope (ΔFI/min) using least regression in Excel spreadsheet on the reaction curve
   Normalize ΔFI/min with sample weight to 0.1000 g as following:
   Normalized ΔFI/min=Slope×(0.1000 g/sample weight g)
   Report lipase activity as ΔFI/min/0.1 g

EXAMPLE 2

Baking Function of Whole Grain Flour with Bepex Heat Moisture and Venting Treatment In this Example, the baking function of whole grain flour made with low pressure heat treatment using a Bepex Turbulizer® heat treated bran and germ component or fraction produced with venting as in Example 1 was compared to the baking function of untreated whole grain flour. The whole grain flours made with natural proportions of bran and germ and endosperm are listed in Table 2 of Example 1. The cookie test baking method used to evaluate the baking functionality of the whole grain flours was the AACC 10-53 Cookie Baking Test.

Solvent Retention Capacity (SRC) serves as a practical test to monitor the function of specific flour components, such as the amount of damaged starch. The SRC assay method used was adapted and modified from AACC method 56-10, according to the following procedure:

Materials:
  50 ml centrifuge tubes+caps
  5% weight sodium carbonate solvent
  Centrifuge (IEC, Centra GP8, 269 rotor, 2130 rpm)

Procedure:
  1. Weigh 50 ml centrifuge tubes+caps (for special tubes weight O-ring seals)
  2. Weigh and add 5.00 g of bran-germ mixture to each tube (determine moisture content of mixture)
  3. Add 25 g of solvent (pre-weighed solvent aliquots) to each tube
  4. Allow it to hydrate for 20 min, shaking every 5 min (5, 10, 15, 20)
  5. Centrifuge for 15 min at 1000×g
  6. Decant supernatant and drain 5 min at 45° angle and 5 min at 90° angle.
  7. Put cap back and weigh pellet
  8. Calculate:

$$SRC\% = \left[\left[\left[\frac{\text{tube, stopper, gel wt} - \text{tube, stopper}}{\text{Flour wt}}\right] - 1\right] \left[\frac{86}{100 - \text{flour moist}}\right] \times 100\right]$$

AACC 10-53 Cookie Test Baking Method

The AACC 10-53 Cookie Test Baking Method was designed at Nabisco Biscuit Company for evaluation of ingredient functionality and predictive correlation between sensory and mechanical texture analysis (mechanical texture analysis by TAXT2 Texture analyzer 3-point bend or puncture test). The test is an improvement over AACC 10-52 Sugar-Snap Cookie Test Baking Method as confirmed by USDA Soft Wheat Quality Lab (Wooster Ohio). The AACC 10-53 test was adopted as the official method of the American Association of Cereal Chemists after collaborative testing by the Soft Wheat Quality Committee in 1992. The equipment, cookie dough composition, mixing procedure, baking procedure, measurement procedure, etc. used in the test are:

Equipment
  Moisture Analyzer, disposable sample pans for determination of flour moisture.
  Digital Thermometer (Omega model 872A) with thermocouple
  C-100 Hobart Mixer with 3-quart mixing bowl and paddle.
  National Test Baking Oven.
  Aluminum cookie sheet-26 cm width×30 cm length with 2 gauge bars 12 mm width×30 cm length×7 mm height.
  Cookie cutter (60 mm internal diameter).
  Rolling pin with sleeve (sleeve lines run along length of pin).
  Spatulas, brown absorbent paper, aluminum foil, plastic beakers
  TA-XT2 Texture Analyzer Optional test for dough rheology—special pan dimensions with 10 cm, length 10.5 cm, height 3.2 cm Standard Formulation AACC 10-53 Single Batch to Make 4 Test Cookies:

| Stage-1 | |
| --- | --- |
| Nonfat dry milk powder | 2.25 g |
| Salt | 2.81 g |
| Sodium bicarbonate | 2.25 g |
| Vegetable shortening (Sans Trans 39, Cargill) | 90.00 g |
| Stage-2 | |
| Ammonium bicarbonate | 1.13 g |
| High fructose corn syrup; 42% fructose, 71% solids | 3.38 g |
| Water* | 49.50 g |
| Stage-3 | |
| Flour (at 13% moisture) | 225.00 g |

Measure flour moisture content on each day of baking; adjust levels of flour and water to compensate for deviations from 13% moisture content Record flour moisture content and insert as FM into equation to calculate actual flour weight per batch Actual flour weight (g)=87/(100-FM)*225 g Record actual flour weight per batch and insert as AFW in equation to calculate actual weight of added water per batch Actual added water (g)=49.5g+225−AFW*225 g General Mixing Procedure:
  Stage-1: blend dry ingredients (nonfat dry milk, salt, bicarbonate, sugar)
  Add fat
  Mix in Hobart mixer 3 minutes at low speed; scrape paddle and sides of bowl after each minute of mixing.
  Stage-2: dissolve ammonium bicarbonate in water; add high fructose corn syrup.
  Add total solution to stage-1;
  Mix 1 min at low speed, scraping bowl and paddle after each 30 sec.
  Mix 2 min at medium speed, scraping bowl and paddle after each 30 sec.
  Stage-3: Add flour, fold into liquid mixture 3 times. Mix 2 minutes at low speed scraping paddle and bowl after each 30 seconds.

Baketime Determination:
  The baketime is defined as the time required to produce a weight loss of 13.85% during baking of the formulation at 400° F.

To measure Baketime:
  Bake formulation at 400° F. for 10, 11, 12, 13 min and for some whole grain flours up to 16 minutes, weighing the bake sheet+cookies after each minute interval.
  Plot % weight loss during baking vs. bake time in minutes.
  Interpolate baketime required to achieve 13.58% weight loss.

Baking Specifications:
  Preheat oven to 400° F. (202° C.).
  Record weight of cold cookie sheet.
  Place cookie sheet in oven for standard baketime; record weight of hot sheet.

Procedure for Preparation of 4 Dough Blanks for Cookie Test Baking:

Portion four 60 g pieces of dough with minimum deformation and place on cookie sheet. Lay rolling pin across gauge bars of cookie sheet allowing weight of pin to compress the dough pieces without additional compressive force. Pick up rolling pin and place on gauge bars at end of cookie sheet, and roll only once away from you. Cut cookies with 60 mm cutter, and carefully lift scrap dough with small spatula. Lift cutter straight up to avoid horizontal distortion.

Record weight of dough blanks and cookie sheet.

Place dough blanks and cookie sheet in the oven in the direction of sheeting Bake cookies at 400° F. for predetermined bake-time.

Weigh cookie sheet with cookies on it immediately upon removal from oven. Carefully remove cookies from sheet with flat spatula and place flat on brown paper in the same direction in which they were sheeted and baked.

Geometry Measurements (Taken when Cookies are Cooled, at Least 30 Minutes):

Width-diameter perpendicular to direction of sheeting: Lay 4 cookies in a row with rolling-pin-sleeve lines parallel to length of meter stick. Record measurement in cm.

Length-diameter parallel to sheeting: Rotate cookies 90° so rolling-pin-sleeve lines are perpendicular to meter stick. Record measurement in cm.

Stack Height: Stack 4 cookies and place stack on side between flat guides. Record height.

In Table 3, are shown the SRC and baking results for control and Bepex low pressure, vented, heat treated flour (duplicates). Included in Table 3 are: (1) solvent retention capacity of the flour for water, sucrose, sodium carbonate and lactic acid solvents, (2) cookie width, cookie length and stack height, and 3) cookie moisture content:

TABLE 3

SRC and AACC 10-53 Cookie Baking Results

| | Cookie baking | | | | Flour SRC | | | |
|---|---|---|---|---|---|---|---|---|
| Bepex test run | % Wt cookie moisture | Width (cm) 4 | Length (cm) 4 | Stack height (cm) | water | Na2CO3 | sucrose (20% w/w) | Lactic |
| WG Recon | 4.86 | 31.05 | 31.7 | 4.27 | 69.71 | 82.07 | 78.88 | 75.63 |
| Run#1 | 4.51 | 31.77 | 32.61 | 4.07 | 70.55 | 87.39 | 80.50 | 77.56 |
| Run#2 | 4.44 | 31.73 | 32.37 | 4.11 | 74.44 | 89.81 | 83.60 | 79.28 |
| Run#3 | 4.24 | 32.14 | 33.04 | 3.9 | 70.18 | 85.63 | 79.56 | 76.69 |
| Run#4 | 3.98 | 32.8 | 33.27 | 3.92 | 72.62 | 88.07 | 80.43 | 77.84 |

As shown in Table 3, the whole grain flours containing low pressure, vented Bepex processed bran and germ components or fractions demonstrate baking qualities similar to untreated whole grain flour. The heat treated whole grain flours have slightly higher damaged starch and water absorption as measured by sodium carbonate SRC and water SRC compared with those of untreated whole grain flour. Unexpectedly, cookies made with whole grain flour from treated bran and germ spread (31.73 cm to 32.8 cm width and 33.27 cm to 32.37 cm length) more than that of the control (31.05 cm width and 31.7 cm length).

EXAMPLE 3

Sensory Evaluation and Flavor Analysis of 100% Whole Grain Cookies Made with Bepex Turbulizer® Low Pressure, Vented Heat Treated Bran and Germ Components or Fractions In this Example, the objectives are to: 1):evaluate the taste of the 100% whole grain cookies (Part 1) made with Bepex Turbulizer® low pressure, vented heat treated bran and germ components or fractions, as made in Examples 1 and 2, and 2) analyze the wheaty flavor of Bepex Turbulizer® low pressure, vented heat treated bran and germ components or fractions as made in Example 1 (Part 2).

Part I Sensory Descriptive Analysis of 100% Whole Grain Cookie

Whole grain products generally have a wheaty, or green, fatty, oxidized grassy flavor notes, and a grainy taste and are generally less preferred by consumers compared to products made with white flour. Sensory evaluation is used to measure the flavour and texture differences obtained with the low pressure, vented heat treatment process of ground bran and germ components or fractions on whole grain flour. The sensory evaluation looks for positive flavor development and improved textural properties of the product. The amount of moisture and temperature of the process are tested to show the effects they have on the perceivable characteristics of a final product, such as a test cookie prepared as in Example 2. Cookies made with whole grain flour from heat treated bran and germ components or fractions are tested against a base cookie made with a whole grain blend that is untreated as a control, as well as a sample made with a commercial stabilized whole grain flour standard.

Consumer Science Test Objective:

The objectives of the study were:

Profile the perceivable differences between cookies made with whole grains that are varying in the temperature and moisture level in the Bepex Venting process and compare them to samples made with untreated whole grain flour and commercial, stabilized whole grain flour.

Summary of Results:

Of the 39 attributes used to describe samples across all modalities (aroma, appearance, hand touch, flavor, texture, aftertaste/aftereffect) the sample set exhibited statistically significant differences on 8 attributes: nutty, baked and oil aromas, brown color, initial bite hardness, crunchiness, dry texture and salivating in the aftertaste.

The samples tested are identified in Table 4:

TABLE 4

Sample Identification

| ID | Description |
|---|---|
| Test 1 (16.29% moisture content after hydration, and 355° F. process temperature and 3.08% treated moisture content) | Made with Bepex treated bran and germ at a low moisture and low temperature mixed with white flour. |
| Test 2 (16.29% moisture content after hydration, and 430° F. process temperature and 2.18% treated moisture content) | Made with Bepex treated bran and germ at a low moisture and high temperature mixed with white flour. |
| Test 3 (26.29% moisture content after hydration, and 355° F. process temperature and 3.42% treated moisture content) | Made with Bepex treated bran and germ at a high moisture and low temperature mixed with white flour. |
| Test 4 (26.29% moisture content after hydration, and 430° F. process temperature and 2.10% treated moisture content) | Made with Bepex treated bran and germ at a high moisture and high temperature mixed with white flour. |
| WG Recon (8.29% moisture content after hydration | Made with untreated bran and germ mixed with white flour to reconstitute whole grain flour. |
| G3 SWS | Made with commercially available stabilized whole grain flour. |

Test:
The products were 4 weeks of age.
Methodology:

A descriptive panel (n=8), trained with the Tragon QDA™ methodology, was used to evaluate the sensory characteristics of the products. The panellists were selected on the basis of their sensory acuity and descriptive ability. They developed a vocabulary to describe the aroma, appearance, flavor, texture and aftertaste of the samples through a series of moderated discussion sessions.

The samples were evaluated by the panellists, individually, using the vocabulary they created. The samples were presented blind and in a balanced design to minimize bias due to presentation order. Each panellist evaluated all products for all attributes four times.

The data were collected using the web-based Compusense data collection system (Compusense at Hand, Canada) and analyzed with the Tragon QDA™ software. The unstructured line scale used for evaluation was electronically converted to a 100-point scale for analysis. Analysis of Variance (ANOVA) was applied to the data for each attribute, to determine if there were statistical differences among the samples. If so, the Duncan's minimum significant difference post-hoc test was calculated and applied to that particular attribute in order to determine between which samples the differences existed ($p \leq 0.05$).

Attributes and Definitions Used to Evaluate the Sample Set

The sensory attributes, attribute definitions, and judge or panelist instructions for making the sensory attribute evaluations are shown in Table 5:

TABLE 5

Sensory Attributes, Attribute Definitions and Judge Instructions

| Attribute | Definition |
|---|---|
| Aroma Judge instructions: Lift the sample to the nose and evaluate the following aroma attributes: | |
| SWEET (weak - strong) | The intensity of a sweet aroma (of any kind, including brown sugar or cooked white sugar). |
| WHEAT (weak-strong) | The intensity of wheat aroma, reminiscent of wheat flour or whole wheat bread, possibly similar to a wheat berry. |
| NUTTY (weak-strong) | The intensity of a nutty aroma, like a peanut or generic nut, possibly that has been gone stale. Also reminiscent of stale peanut butter. |
| BAKED (weak - strong) | The intensity of baked aroma, with samples on the high end of the scale being over-baked close to burnt. |
| OIL (weak - strong) | The intensity an oil aroma, which could be any type of oil aroma. This could include a stale oil aroma with a rancid off-note like an expired cookie or like over-used cooking oil. |
| CORN (weak-strong) | The intensity of corn aroma, reminiscent to corn meal or corn bread. |
| Appearance- Judge Instructions: Look at the sample and evaluate the following appearance attributes: | |
| BROWN COLOR (light - dark) | The intensity of the brown color of the top of the cookie, ranging from light brown to darker brown. |
| EDGE COLOR (light-dark) | The intensity of the color of the edges, with samples on the higher end of the scale appearing to have darker near burnt edges. |
| OPPOSITE CONTRAST (low-high) | The measure of the difference in appearance between the top and bottom of the cookie. |
| Hand Touch-Judge Instructions: While holding the sample, evaluate the following hand touch and appearance attributes: | |
| ROUGH SURFACE (slightly - very) | The measure of how rough the top of the cookie feels. |
| CRUMBS (a little - a lot) | The amount of crumbs noticed on the fingers after handling the cookie. |
| OILY (slightly - very) | The amount of oily residue felt on the fingers after handling the cookie. |

TABLE 5-continued

Sensory Attributes, Attribute Definitions and Judge Instructions

| Attribute | Definition |
|---|---|
| Texture/Mouthfeel - Judge instructions: Take 1 bite with the front teeth and evaluate the following: | |
| INITIAL BITE HARDNESS (soft - hard) | The measure of how hard it is to bite the cookie, with samples on the lower end of the scales similar to a baby cookie. |
| Judge Instructions: Continue to chew the sample with your molars and evaluate the following: | |
| CRUNCHY (slightly - very) | When the cookie is placed between the molars and chewed once, crunchy is the measure of the low pitch heard during the first few chews. A cookie that is only slightly crunchy may crunch like a Chewy Granola Bar, where a cracker that is very crunchy may crunch like Crunchy Granola Bar. |
| CRUMBLY (slightly - very) | The measure of how crumbly the cookie is in the mouth after 1-2 chews. A cookie that is only slightly crumbly may crumble like a Ginger Snap cookie. A cookie that is very crumbly may crumble like a Stella D'Oro Roman Egg Biscuit. |
| DRY (slightly - very) | The measure of how dry the cookie feels in the mouth as noticed after 1-2 chews. |
| DISSOLVE RATE (cookie) (slow - quick) | The measure of how quickly the cookie dissolves, or breaks down, as it's being chewed to the point of swallow. |
| NOTICEABLE PARTICLES (a little - a lot) | The amount of noticeable particles in the mouth similar to corn meal or corn bread, ranging from a little to a lot. |
| MOUTHCOATING (slightly - very) | The measure of any kind of mouthcoating, which could include an oily or pasty mouthcoat. Slimy feeling |
| STICKS TO TEETH (slightly - very) | The measure of how much cookie is stuck in the teeth during the evaluation and after swallowing/expectorating. |
| Flavor- Judge Instructions: Take 1 bite at a time, chew, and evaluate the following flavor attributes: | |
| OVERALL FLAVOR (weak-strong) | The intensity of overall flavor. |
| SWEET (weak - strong) | The intensity of a sweet taste (of any kind), which could be reminiscent of sugar or brown sugar. |
| SALT (weak - strong) | The intensity of salt taste in the mouth. |
| WHEAT (weak-strong) | The intensity of wheat flavor reminiscent of wheat flour, a grainy possibly similar to a wheat berry. |
| NUTTY (weak-strong) | The intensity of a nutty flavor, like a peanut or generic nut, possibly that has been gone stale. |
| BAKED (weak-strong) | The intensity of baked flavor, with samples on the high end of the scale tasting more overbaked. |
| OIL (weak - strong) | The intensity an oil flavor, which could be any type of oil. This could include a stale oil aroma with a rancid off-note like an expired cookie. |
| BUTTER (weak-strong) | The intensity of a butter flavor, like fresh unsalted table butter. |
| CORN (weak-strong) | The intensity of corn flavor, reminiscent to corn meal or corn bread. |
| Aftertaste/Aftereffect- Judge Instructions: Take a bite of the cookie, chew and swallow. Wait 15 seconds after swallowing to evaluate the following aftertaste/aftereffect attributes: | |
| SWEET (weak - strong) | The intensity of a sweet aftertaste in the mouth. |
| OIL (weak - strong) | The intensity an oil flavor, which could be any type of oil. This could include a stale oil aroma with a rancid off-note like an expired cookie. |
| BITTER (weak-strong) | The intensity of a bitter aftertaste in the mouth due to rancid oil bitter, similar to expired mixed nuts. |
| WHEAT (weak-strong) | The intensity of wheat aftertaste reminiscent of wheat flour, a grainy possibly similar to a wheat berry. |
| CORN (weak-strong) | The intensity of corn aftertaste, reminiscent of corn bread or corn meal. |
| STICKS TO TEETH (slightly - very) | The measure of how much the cookie sticks to the teeth as it is being chewed. |
| SALIVATING (a little - a lot) | The measure of how much the mouth salivates during the aftertaste. |
| MOUTH DRYING (slightly-very) | The measure of how drying the cookie makes the mouth feel, like a drink of water is needed. |
| MOUTHCOATING (slightly - very) | The measure of how much of a mouthcoating (of any type) is felt in the mouth. |
| LINGER (weak - strong) | The measure of the overall impact of any lingering aftertastes in the mouth. |

The sensory attribute means of the biscuit samples are shown in Table 6:

TABLE 6

Sensory Attribute Means of Biscuits

| Sample ID and Attribute | Sample G3SWS (Control) | Sample WG Recon (Control) | Sample Test 1 | Sample Test 2 | Sample Test 3 | Sample Test 4 |
|---|---|---|---|---|---|---|
| Initial hydration Moisture Content, wt % | — | 8.29 | 16.29 | 16.29 | 26.29 | 26.29 |
| Treatment Temp, ° F. | — | — | 355 | 430 | 355 | 430 |
| Treated Moisture Content, wt % | — | — | 3.08 | 2.18 | 3.42 | 2.10 |
| Sweet Aroma | 23.12 | 20.77 | 22.60 | 25.01 | 20.96 | 17.12 |
| Nutty Aroma | 27.48 | 31.55 | 29.60 | 34.18 | 29.86 | 30.91 |
| Oil Aroma | 38.39 | 43.63 | 48.34 | 47.35 | 49.65 | 47.40 |
| Wheat Aroma | 29.15 | 30.83 | 32.25 | 33.68 | 30.18 | 32.20 |
| Baked Aroma | 34.88 | 35.79 | 39.02 | 40.62 | 35.97 | 38.62 |
| Corn Aroma | 36.21 | 39.97 | 39.99 | 38.55 | 35.71 | 36.70 |
| Brown Color | 36.67 | 32.75 | 36.88 | 41.90 | 34.82 | 41.98 |
| Edge Color | 42.44 | 40.09 | 41.38 | 42.19 | 40.96 | 44.05 |
| Opposite Contrast | 46.03 | 43.25 | 47.36 | 45.98 | 46.98 | 48.81 |
| Rough Surface | 32.70 | 31.03 | 30.03 | 30.99 | 31.68 | 32.26 |
| Crumbs Hand Touch | 35.83 | 37.02 | 33.15 | 34.72 | 32.69 | 32.93 |
| Oily Touch | 40.31 | 39.03 | 40.22 | 38.06 | 42.89 | 39.40 |
| Initial Bite Hardness | 34.05 | 28.37 | 32.49 | 29.60 | 34.10 | 29.69 |
| Crunchy | 38.76 | 29.90 | 36.59 | 34.33 | 39.92 | 33.43 |
| Crumbly | 51.97 | 52.35 | 51.92 | 50.21 | 50.20 | 51.03 |
| Dry | 52.97 | 58.08 | 52.91 | 56.26 | 53.93 | 59.58 |
| Dissolve Rate | 51.46 | 49.28 | 52.35 | 49.83 | 49.17 | 49.52 |
| Noticeable Particulates | 38.60 | 38.63 | 35.02 | 35.19 | 40.63 | 41.11 |
| Mouth Coating | 48.39 | 48.71 | 48.92 | 50.19 | 51.82 | 50.83 |
| Sticks to Teeth | 33.04 | 33.40 | 30.92 | 30.98 | 32.58 | 30.73 |
| Overall Flavor | 46.25 | 47.28 | 47.79 | 47.79 | 48.19 | 42.94 |
| Sweet Flavor | 25.64 | 22.24 | 25.25 | 22.77 | 23.59 | 22.44 |
| Salt Flavor | 30.74 | 28.70 | 29.57 | 29.38 | 30.07 | 30.10 |
| Wheat Flavor | 31.06 | 32.07 | 29.78 | 32.24 | 31.58 | 34.05 |
| Nutty Flavor | 28.57 | 28.14 | 29.60 | 30.46 | 32.86 | 32.75 |
| Baked Flavor | 37.52 | 37.52 | 38.78 | 38.17 | 41.58 | 40.24 |
| Oil Flavor | 47.02 | 46.50 | 47.18 | 46.97 | 50.09 | 50.15 |
| Butter Flavor | 19.93 | 19.85 | 20.83 | 21.73 | 21.52 | 18.57 |
| Corn Flavor | 38.54 | 42.46 | 39.86 | 39.13 | 39.10 | 38.93 |
| Sweet Aftertaste | 19.34 | 20.75 | 20.12 | 20.77 | 19.90 | 19.92 |
| Oil Aftertaste | 40.58 | 38.09 | 41.62 | 42.65 | 41.18 | 43.28 |
| Bitter Aftertaste | 30.58 | 33.77 | 34.49 | 32.68 | 33.85 | 35.78 |
| Wheat Aftertaste | 28.48 | 38.09 | 41.62 | 42.65 | 41.18 | 43.28 |
| Corn Aftertaste | 35.57 | 38.00 | 36.98 | 36.58 | 37.01 | 37.95 |
| Sticks to Teeth Aftertaste | 24.08 | 22.62 | 25.25 | 25.61 | 27.68 | 22.72 |
| Salivating Aftertaste | 31.25 | 32.17 | 29.87 | 36.31 | 32.07 | 29.60 |
| Mouth Drying Aftertaste | 47.97 | 52.20 | 51.16 | 52.20 | 52.04 | 50.58 |
| Mouth Coating Aftertaste | 45.92 | 48.29 | 46.90 | 48.11 | 49.55 | 47.92 |
| Lingering Aftertaste | 56.91 | 58.03 | 57.26 | 56.30 | 58.00 | 56.91 |

Results:

There were several significant differences found between the samples in aroma, appearance and texture. In terms of aroma, the samples varied in nutty, baked and oil attributes. The low moisture/high temperature test sample was the highest in nutty and baked attributes, significantly higher than both low temperature samples and the G3SWS sample in nutty attribute, and higher than the high moisture/low temperature, WG reconstituted and G3SWS samples in baked attribute.

All of the treated samples had an increased oil aroma, which the panel denoted as stale oil-like in expired cookies, and it was significantly higher than in the G3SWS sample.

In terms of appearance, both high temperature treated samples were significantly darker in brown color than all the other samples.

Texturally, whole grain samples are harder, drier and denser. These samples showed differences in initial bite hardness, crunchiness and dryness. In initial bite hardness, the high moisture/low temperature and G3SWS samples were significantly harder than the high moisture/high temperature, low moisture/high temperature and WG reconstituted samples. The low temperature treated samples and the G3SWS samples showed to be crunchier than the WG reconstituted sample.

The three attributes of crunchy, initial bite hardness, and dryness were all significantly affected by temperature. Crunchy decreased as temperature increased, initial bite hardness decreased as temperature increased, and dryness increased as temperature increased. Moisture Level did not show a significant effect on these three attributes. Both nutty aroma and brown color appearance increased as temperature increased, and moisture level did not show a significant effect on these attributes. Noticeable particles increased as moisture level increased and temperature did not show a significant effect on this attribute.

Part II: Flavor Analysis of 100% Whole Grain Cookies Made with Bepex Turbulizer® Low Pressure, Vented Heat Treated Bran and Germ Components or Fractions.

An untreated bran and germ sample (control) and Bepex Turbulizer® low pressure, vented heat treated bran and germ component samples (Test #1, #2, #3 and #4) were analyzed by dynamic headspace GC-MS. Compounds were identified by MS library match and levels were normalized by using an internal standard.

Venting of volatiles during the stabilization of the bran and germ components or fractions reduced the amount of volatile compounds related to wheaty flavor. Treatment of bran and germ components or fractions at high temperature (350° F.) tended to develop nutty flavor type of compounds that might skew the overall flavor of the WG baked goods. Development of these nutty flavor compounds was independent of the moisture level stabilization conditions (8% and 18%).

Bepex Turbulizer® low pressure, vented heat treated bran and germ component samples showed lower levels of wheaty related compounds compared to the un-stabilized bran and germ control sample. The response levels for wheaty related compounds ranged from about 50,000 to about 125,000 for Sample #1, from about 75,000 to about 100,000 for Sample #2, from about 50,000 to about 140,000 for Sample #3, from about 100,000 to about 345,000 for Sample #4, and from about 400,000 to about 1,300,000 for the control. This finding indicates that venting of volatile compounds during the low pressure Bepex Turbulizer® heat treatment process will unexpectedly reduce the potential carryover of volatile compounds into the whole grain flour compared to the carryover of volatile compounds for the control.

Wheaty related compounds were found to be unexpectedly lower in all stabilized bran and germ component samples compared to the bran and germ component control (un-stabilized bran and germ and germ. The level of wheaty related compounds perceived at low levels as grassy and green, and fatty, rancid and cardboard in crackers were found to be reduced in the stabilized bran and germ components or fractions.

Bran and germ component or fraction high processing temperature conditions (jacket temperature of 430° F.) might skew the overall flavor profile of the baked good due to generation of nutty flavor related compounds such as pyrazine and dimethylpyrazine in Samples #2 and #4. As shown in the Sole FIGURE, the bran and germ components or fractions of Samples #1 and #3 treated at 355° F. (jacket temperature) were found to generate less nutty flavor related compounds compared to bran and germ component or fraction Samples #2 and #4, treated at 430° F. (jacket temperature), but the generation of the nutty flavor compounds (pyrazine in the left column, and dimethyl-pyrazine in the right column) for each of Samples 1, 2, 3, and 4 was unexpectedly greater than generated in the untreated control.

The bran and germ treatment temperature has significant effect on the nutty flavor and brown color of the 100% whole grain flour cookie. Moisture Level did not show a significant effect on these attributes. Venting of volatiles during the stabilization of bran and germ (B&G) reduced the amount of volatile compounds related to wheaty flavor.

EXAMPLE 4

Part A. Production of Extruded Heat Treated Bran and Germ Component (B&G)

In this example, a ground bran and germ component or fraction is subjected to extrusion at different process conditions to obtain an extruded heat treated bran and germ component or fraction with the objective of reduced whole grain flour nutrient loss, reduced whole grain flour function damage, and improved sensory attributes of whole grain flour baked products made with the extruded heat treated bran and germ component or fraction. The process conditions varied include bran and germ component or fraction moisture content, bran and germ component or fraction feed rate, and screw rotating speed as shown in Table 7.

TABLE 7

Ground Bran and Germ Component or Fraction Extrusion Conditions

| Run No. | B&G Feed Rate (Kg/hr) | Water Feed Rate (Kg/hr) | Screw Rotating Speed (rpm) |
|---|---|---|---|
| 1 | 61.87 | 11.48 | 500 |
| 2 | 61.87 | 9.94 | 500 |
| 3 | 101.15 | 0.71 | 350 |
| 4 | 150.57 | 0.71 | 500 |
| 5 | 150.57 | 5.33 | 500 |
| 6 | 132.83 | 5.33 | 350 |

An Acrison volumetric feeder with a 2" ribbon screw is used to obtain a different bran and germ component (12% moisture) feed rate (61.87 kg/hr. to 150.57 kg/hr.) into a twin screw cooker extruder (MPF-50 Mark II L/D 25:1) manufactured by Baker Perkins (Model No. 7-1988)

The water feed rate to the barrel is varied from 0.71 kg/hr to 11.48 kg/hr by an extrusion process water pump (Bran Lubbe N-P31)). The screw is rotated at operative speeds from 350 to 500 rpm. After a working step, the bran and germ component is forced through a die orifice to form a bran and germ extrudate by using a chain die head (Haensel Processing 2812). The extrudate is cut and cooled through a two zone 10 ft. long drying oven (Radiations Systems). During each run, the extruder torque is recorded. The shear rate and specific mechanical energy (SME) was calculated based on the extruder configuration and process conditions as shown in Table 8:

TABLE 8

Experiment Design And The Extruder Barrel Temperature, Torque, SME And Shear Rate During Bran And Germ Extrusion Process.

| | Barrel Temperature (° F.) | | | | | SME | SME | Shear Rate | Product Temp | Design Moist. |
|---|---|---|---|---|---|---|---|---|---|---|
| Sample | Zone 6 | Zone 7 | Zone 8 | Zone 9 | Torque | (KWH/KG) | (W * hr/KG) | (per min) | (° F.) | Shear |
| 1 | 158 | 199 | 213 | 241 | 0.26 | 0.04 | 36 | 4424 | 197 | HH |
| 2 | 153 | 200 | 214 | 250 | 0.28 | 0.04 | 39 | 4424 | 200 | HH |

TABLE 8-continued

Experiment Design And The Extruder Barrel Temperature, Torque, SME
And Shear Rate During Bran And Germ Extrusion Process.

| Sample | Barrel Temperature (° F.) | | | | Torque | SME (KWH/KG) | SME (W * hr/KG) | Shear Rate (per min) | Product Temp (° F.) | Design Moist. Shear |
|---|---|---|---|---|---|---|---|---|---|---|
| | Zone 6 | Zone 7 | Zone 8 | Zone 9 | | | | | | |
| 3 | 157 | 200 | 309 | 356 | 0.80 | 0.05 | 47 | 3097 | 200 | LL |
| 4 | 149 | 203 | 344 | 390 | 0.90 | 0.05 | 51 | 4424 | 197 | LH |
| 5 | 149 | 201 | 350 | 392 | 0.80 | 0.05 | 46 | 4424 | 193 | MH |
| 6 | 150 | 206 | 345 | 376 | 0.90 | 0.04 | 41 | 3097 | 195 | ML |

SME = (screw speed actual/screw speed rated) × % Torque (motor power rated/feed rate (kg/hr) = KWH/KG;
shear rate = ((pi) * (barrel diameter/screw diameter) * rpm))/((screw diameter − root diameter)/2)
Extruder motor power: 40 HP * 0.746 = 30 KW, Barrel Diameter = 2"; Screw Diameter = 1.880"; Root Diameter = 1.125".

Part B: Whole Grain Flour and Bran & Germ Characterization

After the heat treating extrusion process, each bran and germ extrudate was ground into a fine powder (85% through US#70 sieve) by using a Bauermeister Gap Mill Model GM 40. The ground bran and germ was recombined with the remaining flour fractions (break flour+reduction flour) to form a whole grain flour.

Whole grain flour particle size distribution was determined using a Roto Tap. The method is applicable to a wide variety of products and ingredients which uses a uniform mechanical action to assure accurate, dependable results. The shaker reproduces the circular and tapping motion used in hand sieving. The method was adapted from the ASTA 10.0 RoTap Shaker method with the following modifications and adaptations:

Whole Grain Flour Particle Size Distribution Method
The apparatus employed is:
1. Tyler RoTap electric testing sieve shaker (Fisher Scientific), with automatic timer.
2. U.S. Standard Sieves, #20, #35, #40, #50, #60, #80, #100, bottom separator pan, and cover
3. Weigh balance, accurate to 0.1 g
4. Brushes for cleaning screens
5. Silicon powder flow aid (Syloid #244, W.R. Grace & Co.)

The procedure employed is:
1. Use clean, thoroughly dried, tared sieves.
2. Accurately weigh the designated size of sample (to nearest 0.1 g) into a 250 ml or 400 ml beaker
3. Tare the appropriate sieves and bottom pan individually
4. Stack the sieves on the shaker with the coarsest opening at the top and increase in fineness until the finest opening is at the bottom. Place a bottom pan underneath.
5. Transfer the sample quantitatively from the beaker to the top sieve.
6. Place the sieve cover on top, then the shaker plate, circular frame and lower the tap arm
7. Set the timer for 5 minutes
8. After completion of shaking, remove sieves from RoTap and carefully weigh each sieve and the pan separately.

The calculations employed are:
1. Using one sieve
   a.

$$\% \text{ on} = \frac{(\text{wt. of sieve} + \text{material}) - \text{wt. of sieve}}{\text{wt. of sample}} \times 100$$

b. % thru = 100 − % on

2. Using three sieves or more
   Sieve A ($S_a$), coarse, top
   Sieve B ($S_b$), medium, middle
   Sieve C ($S_c$), fine, bottom
   Etc.
   a.

$$\% \text{ on}_a = \frac{(\text{wt. of } S_a + \text{material}) - \text{wt. of } S_a}{\text{wt. of sample}} \times 100$$

b.

$$\% \text{ on}_b = \frac{(\text{wt. of } S_b + \text{material}) - \text{wt. of } S_b}{\text{wt. of sample}} \times 100$$

c.

$$\% \text{ on}_c = \frac{(\text{wt. of } S_c + \text{material}) - \text{wt. of } S_c}{\text{wt. of sample}} \times 100$$

3. The amount of silicon powder flow aid added to the sample should be subtracted from the weight in pan before doing the above calculation.
4. The sum of the percentages on all the screens (plus pan) should be equal to or closely approximate 100%

Whole grain flour moisture content and bran and germ component or fraction moisture content were determined according to AACC Method 44-15A. Ash is determined according to AOAC official method 923.03 for measuring ash in flour and bran & germ. Bran and germ extractable lipase activity was determined as in Example 1.

Table 9 shows the whole grain flour characteristics of: (1) whole grain flour moisture, (2) whole grain flour ash content, (3) bran and germ component or fraction moisture content, (4) bran and germ component or fraction ash content, (5) bran and germ component or fraction lipase activity, and (6) bran and germ component or fraction particle size distribution.

TABLE 9

Bran & Germ Component, And Whole Grain Flour Characterization After Extrusion Treatment

| | WG flour moisture (wt. %) | WG flour ash (as is, wt. %) | Bran and germ ash (wt. % dry base) | Bran and germ moisture (wt. %) | Bran and Germ Lipase (u/g) | Bran and germ particle size (Sieve No.) | | | | | | |
|---|---|---|---|---|---|---|---|---|---|---|---|---|
| | | | | | | 40 | 50 | 60 | 70 | 80 | 100 | Through 100 |
| Run 1 | 13.59 | 1.39 | 3.63 | 14.485 | 4.92 | 0.10 | 0.10 | 3.58 | 7.96 | 7.36 | 9.66 | 70.38 |
| Run 2 | 12.95 | 1.38 | 3.72 | 14.41 | Negative | 0.12 | 0.40 | 4.62 | 8.4 | 8.12 | 10.52 | 67.22 |
| Run 3 | 9.93 | 1.42 | 3.74 | 3.395 | Negative | 0.44 | 1.84 | 4.58 | 4.96 | 4.50 | 6.44 | 76.90 |
| Run 4 | 9.61 | 1.46 | 3.71 | 2.646 | Negative | 0.94 | 2.88 | 4.80 | 5.18 | 4.70 | 6.44 | 75.54 |
| Run 5 | 9.69 | 1.43 | 3.73 | 3.738 | Negative | 0.66 | 3.00 | 4.12 | 5.96 | 5.50 | 7.44 | 73.80 |
| Run 6 | 10.20 | 1.46 | 3.67 | 5.112 | 2.57 | 0.28 | 1.92 | 5.06 | 6.66 | 5.90 | 8.62 | 72.32 |
| Control G3SWS | 12.17 | 1.37 | 3.72 | 11.78 | 662.50 | 0.02 | 1.44 | 4.38 | 5.88 | 6.02 | 6.82 | 74.94 |

SUMMARY AND CONCLUSIONS

The moisture content of the extrusion treated bran and germ component or fraction is high when the water feed rate is high (Run#1, 2). The bran and germ component or fraction total moisture content was 24-26% for Run #1 and #2. The bran and germ component of Run #1 and #2 also has a slightly finer particle size than that of the control G3SWS bran and germ component. When the water feed rate is lower (Run Nos. 3 to 6), the bran and germ moisture content before the extrusion process was significantly lower (about 3% to 5%) compared to the moisture content of untreated bran and germ (11.78%). However, the final whole grain flour moisture content is still close to that of untreated whole grain flour and commercial whole grain flour.

The extrusion heat treatment can reduce the lipase activity (from 662 U/g to negative) for all the runs, compared to the lipase activity of commercially available whole grain flour (164 U/g), indicating that the extrusion heat treatment substantially stabilizes the bran and germ component or fraction, and the whole grain flour containing the bran and germ component or fraction.

EXAMPLE 5

Effect of Extrusion on Whole Grain Flour Functionality and Nutrients

In this example the extrusion effect on the whole grain flour made with the extruded heat treated bran and germ component or fraction of Example 4 is determined in terms of the flour functionality, content of dietary fiber and vitamins E, B1, and B2. Whole grain flour function was tested using the Solvent Retention Capacity test described in Example 2, and by a Modified Alveograph method. The Modified Alveograph Method employed is:
Whole Grain Alveograph Method
Purpose And Scope:
    This method is used to characterize overall biaxial extension of whole grain flour. This procedure is applicable only to whole grain wheat flour.
Summary:
    A calculated amount of whole grain flour is mixed with a calculated volume of 2.5% sodium chloride solution. The resulting dough is then extruded, cut into small patties, and allowed to rest at a stable temperature. The patties are then pressed flat and inflated by air pressure creating a bubble. A graphical representation of the pressure necessary to inflate the patty is then created.

Apparatus:
    A) Water Bath; capable of cooling and heating to within 0.1 degrees Celsius
    B) Chopin Alveograph
    C) Chopin RCV4 Calculator
    D) Epson LX 810 printer
    E) Alveograph Charts
    F) Dropper Bottle
    G) 16 L Carboy Container
Reagents:
    A) 2.5% Sodium Chloride Solution: 400 g NaCl/16000 ml demineralized $H_2O$
    B) Light Mineral Oil (Fisher 0121-4)
Procedure:
    A) Check and Record the Following:
        1) Flour temperature should be between 18-25° C.
        2) Mixing Chambers Temperature should be 24.0±0.2° C.
        3) Resting Chambers Temperature should be 25.0±0.2° C.
        4) Water Bath Temperature should be between 19-22° C.
        5) Room Temperature: 70+/−2.5° F.
        6) Water Salinity: Should be between 2.4-2.6% NaCl.
        7) Relative Humidity: Seal Range 65+15%
Procedure:
    B) Water Addition:
        1) Determine the percent moisture of the flour sample to 0.1%.
        2) Adapt the Alveograph alarms as follows:
Kneading: 14 min
Kneading+resting: 34 min.
        3) Calculate the flour and sodium chloride solution using the corresponding Excel spreadsheet (attached), based on flour % moisture and desired % hydration.
            Note: for preliminary experiments, use both 55% and 60% hydration to determine best test conditions.
        4) Fill the Chopin burette to the calculated volume with 2.5% NaCl solution. If the burette is overfilled, open the stopcock and allow some solution to run out. Use a Kimwipe to tap the remaining water out of the tip of the burette. The burette should deliver the water contained in it in about 20 sec. If the NaCl solution volume is over the Alveograph burette capacity, the volume should be accurately measured using a graduated cylinder.
        5) Weigh the calculated amount of flour (+/−0.5 g) and transfer to mixing bowl.
        6) Start the mixer and the countdown timer. Add the water from the burette into the mixing chamber with the flour.

7) At the end of one minute (timer reading 33 min), stop the mixer and scrape down the bowl, ensuring that all flour is being incorporated into the dough. Do not take more than one minute to complete this step. At the end of one minute (timer reading 32 min) restart the mixer.
8) At this time, you will want to apply the oil (see the next section).

C) Oil Application:

During the 12 remaining minutes of the mixing period all oil should be applied. All drops should be gravity fed with the tip of the applicator not touching the surface. The oil bottle should be held vertical to the surface where the oil is being applied. All oil should be spread with the steel spatula except for the roller, press cap, and press plate which the operator(s) finger or a thin plastic spatula should be used to spread oil.

The following amounts should be applied:
Extrusion Plate: 4 initially; 2 between extrusions
Resting Plate: 5 drops on each plate
Sheeting Plate: 8 drops on each patty area
Roller: 5 drops spread evenly
Press Plate: 4 initially; 2 between patties spread evenly
Press Cap: 2 initially; 1 between patties spread evenly D) Extrusion:
1) After the sample has mixed an additional 12 minutes (timer reading 20 min), stop the mixer, reverse its direction, fully open the extrusion gate, and turn the motor back on. The direction of the mixing blade is now reversed so that the dough can be extruded through the extrusion gate.
2) Scrape mixer walls to avoid dough sticking to the walls. When done, close lid and proceed.
3) Place oiled extrusion plate under the screw in front of the extrusion gap and allow dough to flow out onto the plate.
4) Extrude and cut off the first half inch of dough. This piece may be discarded.
5) Extrude the dough onto the extrusion plate. In doing so work the side of the patty enough to clear the screw heads and keep the front of the dough flipped up. Avoid over-manipulating the dough. Your goal is to let the dough extrude at its natural rate and prevent it from bunching up.
6) When the sheet of dough is approximately 1¾" long, cut the patty and transfer it to the sheeting plate. Cut and extrude a total of five pieces of this length. Place two on each sheeting assembly, except for the third assembly, which will have only one piece of dough.

E) Cutting:
1) Apply a light coat of mineral oil to the cutter to avoid dough sticking to it.
2) Use the cutter to cut out dough pieces. Cut them in the same order as they were extruded.
3) After a dough piece is cut, transfer it to a resting plate. Then place the resting plate to the resting chamber. Care should be taken so that the shape and thickness of the patties is not changed during transfer.
4) Allow dough pieces to remain at rest until the full 34 minutes has expired from the start of the test.

F) Stretching the Dough Pieces:
1) Before using the Alveograph, it must be properly calibrated. Use the calibration nose piece that is provided with the machine.
2) Place a dough piece in the middle of the press plate, screw on the press cap, and spin the press assembly down. There should be 2 full revolutions from start to finish and it should take a total of 20 seconds to do this (10 seconds per rotation).
3) Once the press is all the way down, remove the press cap. Turn the dial on the Alveograph from 1 to 3 (6:00 position) then press the start button on the calculator. When you see the first hole in the bubble press stop on the RCV4 calculator. Repeat this for all 5 dough pieces.
4) To retrieve results when finished, push avg button, then end button. This will average the results and then print the graph.
5) After the graph has printed but before the printer has finished the baseline, hit the cancel button 2 times. The LED readout should say PRET.
6) The individual results now need to be retrieved. Press the Test button, then #1 button, then the enter button. This will access the individual test results for the first patty. Then push scan, this will access to each parameter of the first Alveograph test. Repeat these steps for tests 1-5.

G) Evaluating the Curve:
1) The RCV4 will automatically calculate the results. No need to report W at "L=100" results.

A. Effect of Bran and Germ Extrusion Process on Whole Grain Flour Function as Measured by SRC Using the SRC method described Example 2, changes to whole grain flour functional characteristics were measured.

Table 10 shows the extrusion process variables: (1) bran and germ component feed rate, (2) water feed rate, (3) extrusion shear rate, (4) solvent retention capacity values for the four solvents; water, sucrose, sodium carbonate, and lactic acid:

TABLE 10

SRC Results

| Extrusion Run | B&G Feed rate (Kg/hr) | water Feed rate (Kg/hr) | Shear Rate, per min | Water SRC % | Sucrose SRC % | $Na_2CO_3$ SRC % | Lactic SRC % | Design Moist. Shear |
|---|---|---|---|---|---|---|---|---|
| 1 | 61.87 | 11.48 | 4424 | 92.44 | 126.80 | 156.12 | 121.19 | HH |
| 2 | 61.87 | 9.94 | 4424 | 91.38 | 128.20 | 156.18 | 123.53 | HH |
| 3 | 101.15 | 0.71 | 3097 | 111.38 | 136.59 | 160.14 | 142.24 | LL |
| 4 | 150.57 | 0.71 | 4424 | 109.81 | 136.45 | 159.18 | 141.66 | LH |
| 5 | 150.57 | 5.33 | 4424 | 104.37 | 138.32 | 170.70 | 136.62 | MH |
| 6 | 132.83 | 5.33 | 3097 | 107.10 | 143.50 | 173.94 | 141.28 | ML |
| WG Recon | | | | 64.61 | 76.36 | 78.58 | 70.73 | |

As shown in Table 10, Extruded bran, upon reconstitution to whole grain flour, influences the solvent sorption properties of the flour. Starch damage, measured by sodium carbonate SRC, was high (165%+/−8), for all combination of variables, compared to control (79%).

B. Effect of Bran and Germ Extrusion Process on Whole Grain Flour Function as Measured by Alveoraph Using the Alveograph method described above, changes to whole grain flour functional characteristics were measured. Table 11 shows the extrusion process variables: (1) bran and germ component feed rate, (2) water feed rate, (3) extrusion shear rate, (4) Alveograph values where P is tenacity, L: is extensibility, W is: baking strength, and P/L is the configuration ratio of the curve:

TABLE 11

Alveograph Test Of The Whole Grain Flour Made With Extruded Bran And Germ

| Extrusion Run | B&G Feed rate (Kg/hr) | Water Feed Rate (Kg/hr) | Shear Rate (per min) | P (mm) | L (mm) | W ($10^4 \times j$) | P/L | Design Moist. Shear |
|---|---|---|---|---|---|---|---|---|
| Run 2 | 61.87 | 9.94 | 4424 | 59 | 14 | 37 | 4.21 | HH |
| Run 3 | 101.15 | 0.71 | 3097 | 48 | 10 | 20 | 4.8 | LL |
| Run 4 | 150.57 | 0.71 | 4424 | 41 | 8 | 16 | 5.12 | LH |
| Run 5 | 150.57 | 5.33 | 4424 | 45 | 9 | 19 | 5 | MH |
| Run 6 | 132.83 | 5.33 | 3097 | 52 | 9 | 22 | 5.78 | ML |
| WG Recon | | | | 40 | 31 | 45 | 1.29 | |

As shown in Table 11, all of the extrusion treated samples have a very small bubble, no extensibility, and are very sticky. At low bran and germ component feed rate and high water feed water (Run#2) slightly better dough functionality is exhibit compared that of the other extrusion runs.

C. Effect of Extrusion Process on the Content of Vitamin E, B1, and B2 of Bran and Germ Component Vitamin B1 (Thiamin) of the bran and germ component or fraction was determined according to AOAC 942.23, 970.65 and 981.15. AOAC 942.23, 970.65 and 981.15 was used to measure the Vitamin B2 (Riboflavin) content of the bran and germ component or fraction. Vitamin E content of the bran and germ component or fraction was determined according to AACC 86-06. The results of the vitamin retention rate determinations are shown in Table 12:

TABLE 12

Vitamin Retention Rate Of Extruded Bran And Germ

| | B&G control | Run 1 | Run 2 | Run 3 | Run 4 | Run 5 | Run 6 |
|---|---|---|---|---|---|---|---|
| Bran and germ moisture (%) | 11.78 | 14.50 | 14.41 | 3.40 | 2.65 | 3.74 | 5.11 |
| Vitamin E (IU/100 g, dry base) | 1.81 | 1.40 | 1.29 | 1.76 | 1.95 | 1.77 | 1.69 |
| % Vitamin E retention | | 77.54 | 71.01 | 97.23 | 107.83 | 97.57 | 93.16 |
| Vitamin B1 (mg/100 g, dry base) | 0.44 | 0.43 | 0.43 | 0.01 | 0.01 | 0.03 | 0.07 |
| % Vitamin B1 retention | | 98.35 | 98.25 | 2.35 | 2.33 | 7.08 | 16.77 |
| Vitamin B2 (mg/100 g, dry base) | 0.15 | 0.14 | 0.15 | 0.13 | 0.14 | 0.15 | 0.14 |
| % Vitamin B2 retention | | 93.57 | 101.26 | 89.72 | 95.87 | 96.96 | 91.33 |

Table 12 shows that Vitamin E and B2 have high retention rates for all the runs. However, there is some Vitamin E loss at high water feed rates (Run #1 and #2). Vitamin B1 has significant loss for Run 3 to Run 6 (2.33-16.77% retention rate) at low bran and germ component (B&G) feed rate and water feed rate. However there is no Vitamin B1 loss for Run #1 and #2.

D. Effect of Extrusion Process on the Content of Total Dietary Fiber of Bran and Germ Total dietary fiber of the bran and germ component or fraction was determined according to AOAC 2009.01 and the results are shown in Table 13:

TABLE 13

Total Dietary Fiber Retention Rate Of Extruded Bran And Germ Component

| | B&G control | Run 2 | Run 4 |
|---|---|---|---|
| Total dietary fiber (%) | 25.60 | 24.10 | 27.40 |
| Bran and germ moisture (%) | 11.78 | 14.41 | 2.65 |
| Total dietary fiber (%, dry base) | 29.02 | 28.16 | 28.15 |
| % Total dietary fiber retention | | 97.03 | 96.99 |

As shown in Table 13, the extrusion process changes the total dietary fiber content of the bran and germ component or fraction slightly.

Summary

Extruded bran and germ components, upon reconstitution to whole grain flour, influences the solvent sorption properties of the flour and dough handling properties. The solvent sorption properties of the flour is very high compared to control which will have a negative impact on dough machinability and baking performance, but would be good for the production of high moisture content baked goods such as cakes and breads. The Alveograph results also show that the whole grain flour dough is sticky and has no extensibility. The extrusion process retains all the dietary fiber content of the bran and germ component. However, the extrusion process can influence the Vitamin content of the bran and germ component or fraction. To obtain a high vitamin recovery rate, the extrusion process conditions should be chosen carefully, for example Run #1 and Run 2 will provide high vitamin retention rates.

EXAMPLE 6

Baking Functionality of Whole Grain Flour and Sensory Evaluation of Chemically Leavened Cracker Made with Extrusion Heat Treated Bran and Germ Component In this example, in Part I, the baking functionality of whole grain flour made with extrusion heat-treated bran and germ component of Examples 4 and 5 is evaluated. In Part II of this example, the taste and texture of 100% whole grain crackers made with the extrusion heat-treated bran and germ component of Examples 4 and 5 is evaluated.

Part I: Baking Functionality

In this example, the baking functionality of whole grain flour made with extrusion processed bran and germ components of Examples 4 and 5 is compared to baking functionality of untreated whole grain flour. The extruded bran and germ components or fractions and the whole grain flours made with natural proportions of bran and germ and endosperm are described in Examples 4 and 5, Runs 2 and 4 and Control, for example in Tables 7-13. The chemically leavened cracker test baking method used to evaluate the baking functionality of the whole grain flours is the cracker method of Kweon et al., *Cereal Chemistry*, 88(1):19-24 (2011). The test formula used in baking is listed in Table 14:

TABLE 14

Basic Ingredients and Formula for a Chemically Leavened Cracker Method

| Ingredient | Formula (g) |
|---|---|
| Flour | 100.0 (14% moisture) |
| Fine-granulated sucrose | 9 |
| Salt | 0.75 |
| Sodium Bicarbonate | 1.25 |
| Ammonium bicarbonate | 1.25 |
| Monocalcium phosphate | 1.25 |
| Shortening | 12 |
| Water | 29 |

Baking Results

Table 15 shows the baking results for the 100% whole grain crackers made with the G3SWS control whole grain flour and the whole grain flours containing the extrusion heat treated bran and germ components or fractions of Run #2 and Run #4:

TABLE 15

Cracker Baking Results

| Sample | Stack height, 10 crackers, inches | Length, inches | Moisture Content wt. % |
|---|---|---|---|
| G3SWS control | 1.82 | 2.11 | 1.22 |
| Extruded B&G Run #2 | 1.44 | 2.02 | 1.84 |

TABLE 15-continued

Cracker Baking Results

| Sample | Stack height, 10 crackers, inches | Length, inches | Moisture Content wt. % |
|---|---|---|---|
| Extruded B&G Run #4 | 1.59 | 1.99 | 2.01 |

As shown in Table 15, the untreated control cracker, G3SWS, exhibited a better stack height and longer length than that of the crackers made with the extruded bran and germ component Run #2 and Run #4. The cracker made with extruded bran and germ component Run #4 is darker than the untreated control cracker G3SWS, and the cracker made with extruded bran and germ Run #2.

Part II. Sensory Evaluation

In this example, the taste, flavor, and texture of whole grain crackers made with whole grain flour containing the extrusion processed bran and germ component of Examples 4 and 5, Run #2 is compared to that of whole grain crackers made with the untreated whole grain flour control G3SWS.

Methodology for Sensory Evaluation

The products were evaluated by an expert taste panel in quantitative format; blind and labeled with 3-digit codes. Data was collected and analyzed with Senpaq v. 4.3 (p<0.1).

Results:

Compared to the control G3SWS, the crackers made with the whole grain flour containing the extrusion treated bran and germ component of Run #2 were evaluated as being harder, crisper, moister, more oily mouthcoating, more baked, less raw, less wheaty, less bran, less woody, more caramelized, and more heated oil, and having fewer particulates, and smaller particles.

Overall, the extrusion reduces the wheaty characteristics (flavor, particulates, dryness), but makes the products harder and does not improve flakiness.

Summary

The 100% whole grain crackers made with whole grain flour from extrusion treated bran and germ components had lower stack height and crisper bite. Sensory descriptive results indicated extrusion reduces the wheat characteristics (flavor, particulates, dryness), but makes the products harder and does not improve flakiness.

What is claimed is:

1. A method for improving the flavor and texture of a ground bran and germ component comprising:

subjecting a ground bran and germ component to heating while conveying and mixing the ground bran and germ component in a conveying and mixing device, said ground bran and germ component comprising bran and germ having at least 50% by weight bran and a moisture content of from about 5% by weight to about 12% by weight, based upon the weight of the ground bran and germ component, said heating being to a temperature of from about 290° F. to about 430° F. and being conducted for a period of time of from about 1 minute to about 6 minutes to volatilize volatile wheaty flavor components and moisture in the ground bran and germ component, to develop a buttery, nutty, caramelized flavor in the bran component, and to reduce lipase activity of the bran and germ component, removing the wheaty flavor components and moisture from the mixing and conveying device by venting during said heating to reduce the moisture content of the bran and germ component by about 30% by weight to about 75% by weight and to obtain a dried ground bran and germ component having a moisture content of from about 1.5% by weight to about 4.5% by weight, and removing the dried ground bran and germ component from the conveying and mixing device to obtain a non-expanded stabilized ground bran and germ component having a non-wheaty, nutty, caramelized flavor and a non-gritty texture, wherein the bran and germ component comprises starch, and said heating avoids gelatinization of starch contained in the bran and germ component such that starch gelatinization is less than about 25%.

2. The method of claim 1 wherein the volatile wheaty flavor components and moisture are removed by vacuum.

3. The method of claim 1 wherein said heating is conducted indirectly by steam.

4. The method of claim 1 wherein said heating is conducted directly by steam injection into the bran and germ component as it is being conveyed and mixed.

5. The method of claim 1 wherein said heating volatizes wheaty flavor components comprising hexanal, heptadienal, nonanal, decanal, nonenal, heptenal, 1-octen-3-one, 3,5-octadien-2-one, decadienal, nonadienal, or octenal, or combinations or mixtures thereof, which are removed from said device, and produces nutty, caramelized flavor components or Maillard Reaction flavor components comprising at least one member selected from the group consisting of pyrazines and dimethylpyrazines which are retained by the bran and germ component.

6. The method of claim 1 wherein the conveying and mixing device operates at low pressure and exchanges heat through a hollow screw and a jacketed body.

7. The method of claim 1 wherein said ground bran and germ component subjected to said heating has a moisture content of from about 7% by weight to about 9% by weight, based upon the weight of the ground bran and germ component, said heating is to a temperature of about 310° F. to about 330° F., the moisture content of the bran and germ component is reduced by about 30% by weight to about 75% by weight to obtain a dried ground bran and germ component having a moisture content of from about 2.5% by weight to about 3.5% by weight, and said heating is conducted for a period of time of from about 2 minutes to about 4 minutes.

8. The method of claim 1 wherein said ground bran and germ component subjected to said heating has a moisture content of from about 7.5% by weight to about 8.5% by weight, based upon the weight of the ground bran and germ component, said heating is to a temperature of about 310° F. to about 330° F., the moisture content of the bran and germ component is reduced by about 30% by weight to about 75% by weight to obtain a dried ground bran component having a moisture content of from about 2.8% by weight to about 3.2% by weight, and said heating is conducted for a period of time of from about 2.5 minutes to about 3.5 minutes.

9. The method of claim 1 wherein the ground bran and germ component which is subjected to said heating has a temperature of less than about 120° F. at an inlet to the conveying and mixing device, and upon exiting the conveying and mixing device the non-expanded ground bran and germ component having a non-wheaty, nutty, caramelized flavor and a non-gritty texture is in a free-flowing individual particulate form.

10. The method of claim 1 wherein said heating is to a temperature of from about 290° F. to about 410° F.

11. A method for making a whole grain flour with improved flavor and texture comprising:

subjecting a ground bran and germ component to heating while conveying and mixing the ground bran and germ component in a conveying and mixing device, said ground bran and germ component comprising bran and germ having at least 50% by weight bran and a moisture content of from about 5% by weight to about 12% by weight, based upon the weight of the ground bran and germ component, said heating being to a temperature of from about 290° F. to about 430° F. and being conducted for a period of time of from about 1 minute to about 6 minutes to volatilize volatile wheaty flavor components and moisture in the ground bran and germ component, to develop a buttery, nutty, caramelized flavor in the bran component, and to reduce lipase activity of the bran and germ component, removing the wheaty flavor components and moisture from the mixing and conveying device by venting during said heating to reduce the moisture content of the bran and germ component by about 30% by weight to about 75% by weight and to obtain a dried ground bran and germ component having a moisture content of from about 1.5% by weight to about 4.5% by weight, removing the dried ground bran and germ component from the conveying and mixing device to obtain a non-expanded stabilized ground bran and germ component having a non-wheaty, nutty, caramelized flavor and a non-gritty texture, and admixing the non-expanded stabilized ground bran and germ component with an endosperm fraction to obtain a stabilized whole grain flour having a non-wheaty, nutty, caramelized flavor and a non-gritty texture, wherein the bran and germ component comprises starch, and said heating avoids gelatinization of starch contained in the bran and germ component such that starch gelatinization is less than about 25%.

12. The method of claim 11 wherein the volatile wheaty flavor components and moisture are removed by vacuum.

13. The method of claim 11 wherein said heating is conducted indirectly by steam.

14. The method of claim 11 wherein said heating is conducted directly by steam injection into the bran and germ component as it is being conveyed and mixed.

15. The method of claim 11 wherein said heating volatizes wheaty flavor components comprising hexanal, heptadienal, nonanal, decanal, nonenal, heptenal, 1-octen-3-one, 3,5-octadien-2-one, decadienal, nonadienal, or octenal, or combinations or mixtures thereof, which are removed from said device, and produces nutty, caramelized flavor components or Maillard Reaction flavor components comprising at least one member selected from the group consisting of pyrazines and dimethylpyrazines which are retained by the bran and germ component.

16. The method of claim 11 wherein the conveying and mixing device operates at low pressure and exchanges heat through a hollow screw and a jacketed body.

17. The method of claim 11 wherein said ground bran and germ component subjected to said heating has a moisture content of from about 7% by weight to about 9% by weight, based upon the weight of the ground bran and germ component, said heating is to a temperature of about 310° F. to about 330° F., the moisture content of the bran and germ component is reduced by about 30% by weight to about 75% by weight to obtain a dried ground bran and germ component having a moisture content of from about 2.5% by weight to about 3.5% by weight, and said heating is conducted for a period of time of from about 2 minutes to about 4 minutes.

18. The method of claim 11 wherein said heating is to a temperature of from about 290° F. to about 410° F.

* * * * *

UNITED STATES PATENT AND TRADEMARK OFFICE
CERTIFICATE OF CORRECTION

PATENT NO. : 10,136,653 B2
APPLICATION NO. : 14/777219
DATED : November 27, 2018
INVENTOR(S) : Bin Zhao et al.

Page 1 of 1

It is certified that error appears in the above-identified patent and that said Letters Patent is hereby corrected as shown below:

In the Claims

In Column 49, Line 52, delete "bran" and insert --bran and germ--

Signed and Sealed this
Second Day of April, 2019

Andrei Iancu
*Director of the United States Patent and Trademark Office*